(12) United States Patent
Lee et al.

(10) Patent No.: US 12,323,991 B2
(45) Date of Patent: Jun. 3, 2025

(54) METHOD AND APPARATUS FOR TRANSMITTING AND RECEIVING SIGNAL IN WIRELESS COMMUNICATION SYSTEM

(71) Applicant: LG ELECTRONICS INC., Seoul (KR)

(72) Inventors: Youngdae Lee, Seoul (KR); Jaehyung Kim, Seoul (KR); Suckchel Yang, Seoul (KR); Seonwook Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 381 days.

(21) Appl. No.: 17/714,889

(22) Filed: Apr. 6, 2022

(65) Prior Publication Data

US 2022/0330317 A1 Oct. 13, 2022

Related U.S. Application Data

(60) Provisional application No. 63/171,500, filed on Apr. 6, 2021.

(51) Int. Cl.
*H04W 72/23* (2023.01)
*H04L 1/08* (2006.01)
(Continued)

(52) U.S. Cl.
CPC ............... *H04W 72/23* (2023.01); *H04L 1/08* (2013.01); *H04L 1/1812* (2013.01);
(Continued)

(58) Field of Classification Search
CPC ..... H04W 72/23; H04W 76/20; H04W 76/30; H04W 24/08; H04W 56/001;
(Continued)

(56) References Cited

U.S. PATENT DOCUMENTS

2017/0338911 A1\* 11/2017 You ......................... H04W 4/70
2020/0314893 A1   10/2020 Chou et al.
(Continued)

FOREIGN PATENT DOCUMENTS

KR   1020180035638 A   4/2018
WO      2020131373 A1   6/2020

OTHER PUBLICATIONS

Intel Corporation, "On Configured Grant aspects for SDT", 3GPP TSG RAN WG2 Meeting #113-bis-e, Apr. 2021, R2-2102843.
(Continued)

*Primary Examiner* — Habte Mered
*Assistant Examiner* — Nevena Zecevic Sandhu
(74) *Attorney, Agent, or Firm* — BRYAN CAVE LEIGHTON PAISNER LLP

(57) ABSTRACT

According to at least one of the embodiments disclosed herein, a user equipment (UE) may transmit a configured grant (CG) based physical uplink shared channel (PUSCH). However, based on that the CG-based PUSCH is transmitted in a radio resource control (RRC) Inactive state and that the CG-based PUSCH is associated with a specific synchronization signal block (SSB) among broadcast SSBs, the UE may monitor a physical downlink control channel (PDCCH) based on the specific SSB while maintaining the RRC Inactive state.

15 Claims, 13 Drawing Sheets

(51) Int. Cl.
- *H04L 1/1812* (2023.01)
- *H04W 24/08* (2009.01)
- *H04W 56/00* (2009.01)
- *H04W 72/0446* (2023.01)
- *H04W 72/1268* (2023.01)
- *H04W 74/0833* (2024.01)
- *H04W 76/20* (2018.01)
- *H04W 76/30* (2018.01)

(52) U.S. Cl.
CPC ......... *H04W 24/08* (2013.01); *H04W 56/001* (2013.01); *H04W 72/0446* (2013.01); *H04W 72/1268* (2013.01); *H04W 74/0841* (2013.01); *H04W 76/20* (2018.02); *H04W 76/30* (2018.02)

(58) Field of Classification Search
CPC ......... H04W 72/0446; H04W 72/1268; H04W 74/0841; H04L 1/08; H04L 1/1812
See application file for complete search history.

(56) References Cited

U.S. PATENT DOCUMENTS

| | | | |
|---|---|---|---|
| 2022/0022247 A1* | 1/2022 | Agiwal | H04W 72/0453 |
| 2022/0264520 A1* | 8/2022 | Xu | H04W 68/005 |
| 2022/0322419 A1* | 10/2022 | Jeon | H04W 72/21 |
| 2022/0353710 A1* | 11/2022 | Yoshioka | H04W 72/1273 |
| 2022/0394745 A1* | 12/2022 | Schober | H04L 5/0032 |
| 2023/0119744 A1* | 4/2023 | Lin | H04L 5/001 370/329 |
| 2023/0217529 A1* | 7/2023 | Xu | H04W 74/0833 370/329 |
| 2023/0262631 A1* | 8/2023 | Lei | H04W 56/0045 370/350 |
| 2024/0155502 A1* | 5/2024 | Lin | H04W 52/36 |

OTHER PUBLICATIONS

ZTE Corporation, Sanechips, "Control plane aspects of SDT", 3GPP TSG-RAN2 #113b-e, Apr. 12-20, 2021, R2-2103019.

* cited by examiner (a)

(b)

(a)

(b)

METHOD AND APPARATUS FOR TRANSMITTING AND RECEIVING SIGNAL IN WIRELESS COMMUNICATION SYSTEM

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, there is provided a method of transmitting a signal by a user equipment (UE) in a radio resource control (RRC) Inactive state in a wireless communication system. The method may include: receiving an RRC Release message including configured grant (CG) configuration information in an RRC Connected state; switching from the RRC Connected state to the RRC Inactive state based on the RRC Release message; transmitting a CG-based physical uplink shared channel (PUSCH) based on the CG configuration information included in the RRC Release message; monitoring a physical downlink control channel (PDCCH) carrying downlink control information (DCI) including a hybrid automatic repeat request (HARQ) response to the CG-based PUSCH transmission; and determining whether to perform retransmission of the CG-based PUSCH based on a result of the PDCCH monitoring. Based on i) that the CG-based PUSCH is transmitted in the RRC Inactive state, and ii) that the CG-based PUSCH is associated with a specific synchronization signal block (SSB) among SSBs broadcast in the wireless communication system, the UE may monitor the PDCCH based on the specific SSB while maintaining the RRC Inactive state.

The UE may monitor the PDCCH based on a channel property for the specific SSB.

The UE may monitor the PDCCH by assuming that the channel property for the specific SSB is equal to a channel property for the PDCCH.

The RRC Release message may include downlink (DL) frequency resource information related to the CG-based PUSCH and uplink (UL) frequency resource information related to the CG-based PUSCH.

The DL frequency resource information and the UL frequency resource information may include information on a DL bandwidth part (BWP) to be used in the RRC Inactive state and information on a UL BWP to be used in the RRC Inactive state, respectively.

Monitoring the PDCCH based on the specific SSB in response to the CG-based PUSCH may be performed only when the UE maintains the RRC Inactive state.

The CG-based PUSCH transmission may be related to CG small data transmission (CG-SDT) supported in the RRC Inactive state.

The PDCCH monitoring may be performed in a search space configured for the CG-SDT.

The CG configuration information may be related to UE-dedicated RRC signaling.

The specific SSB may be related to initial transmission of a HARQ process to which the CG-based PUSCH belongs.

In another aspect of the present disclosure, there is provided a computer-readable storage medium having stored thereon a program for executing the above-described method.

In another aspect of the present disclosure, there is provided a UE configured to perform the method.

In another aspect of the present disclosure, there is provided a device configured to control the UE configured to perform the method.

In another aspect of the present disclosure, there is provided a method of receiving a signal by a base station (BS) in a wireless communication system. The method may include: transmitting an RRC Release message including CG configuration information while a UE is in an RRC Connected state; receiving a CG-based PUSCH based on the CG configuration information included in the RRC Release message while the UE is in an RRC Inactive state; determining a HARQ response regarding whether to trigger retransmission of the CG-based PUSCH; and transmitting a PDCCH carrying DCI including the HARQ response. Based on i) that the CG-based PUSCH is received while the UE is in the RRC Inactive state, and ii) that the CG-based PUSCH is associated with a specific SSB among SSBs broadcast in the wireless communication system, the BS may transmit the PDCCH based on the specific SSB to the UE maintaining the RRC Inactive state.

In another aspect of the present disclosure, there is provided a BS configured to perform the method.

Advantageous Effects

According to an embodiment of the present disclosure, a user equipment (UE) may not only transmit uplink (UL) data even in a radio resource control (RRC) Inactive state but also accurately and efficiently receive a response to the UL data transmission from a base station (BS) based on a synchronization signal block (SSB) associated therewith It will be appreciated by persons skilled in the art that the effects that could be achieved with the present disclosure are not limited to what has been particularly described hereinabove and other advantages of the present disclosure will be more clearly understood from the following detailed description.

BEST MODE

Figure 1:
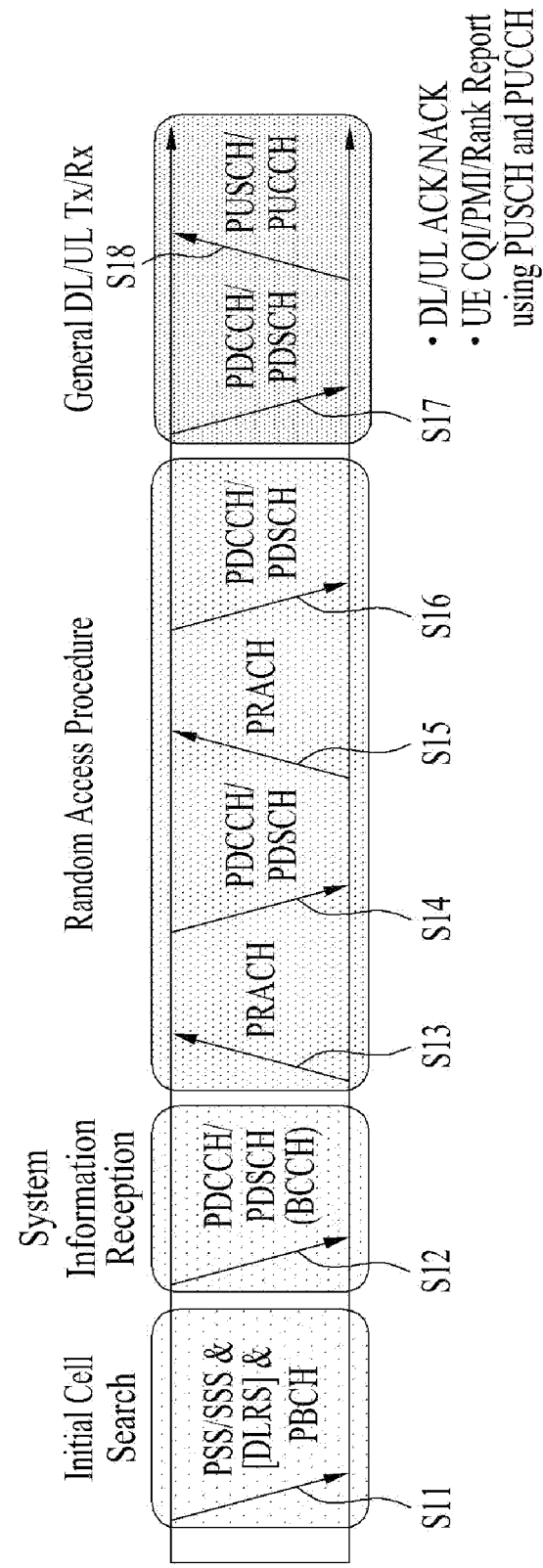
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/user equipments (UEs) sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in following documents.

3GPP NR

3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.287: Application layer support for V2X services; Functional architecture and information flows
3GPP TS 23.501: System Architecture for the 5G System
3GPP TS 23.502: Procedures for the 5G System
3GPP TS 23.503: Policy and Charging Control Framework for the 5G System; Stage 2
3GPP TS 24.501: Non-Access-Stratum (NAS) protocol for 5G System (5GS); Stage 3
3GPP TS 24.502: Access to the 3GPP 5G Core Network (SGCN) via non-3GPP access networks
3GPP TS 24.526: User Equipment (UE) policies for 5G System (5GS); Stage 3

Abbreviations and Terms

PDCCH: Physical Downlink Control CHannel
PDSCH: Physical Downlink Shared CHannel
PUSCH: Physical Uplink Shared CHannel
CSI Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI Slot Format Indicator
COT Channel occupancy time SPS: Semi-persistent scheduling
PLMN ID: Public Land Mobile Network identifier
RACH: Random Access Channel
RAR: Random Access Response
Msg3: Msg3 is a message transmitted on an uplink shared channel (UL-SCH) containing a cell radio network temporary identifier (C-RNTI) medium access control (MAC) control element (CE) or a common control channel (CCCH) service data unit (SDU), which is related to contention resolution of a UE as part of a random access procedure.
Serving Cell: A PCell, a PSCell, or an SCell
MO: Mobile Originated
MT: Mobile Terminated
PUR: Preconfigured UL Resource
SRI: SRS Resource Indicator
CRI: CSI-RS Resource Indicator
SSBRI: SSB Resource Indicator
RSRP: Reference Signal Received Power
BD: Blind Detection
RACH: Random Access Channel
PUR SS: Preconfigured Uplink Resource Search Space. The PUR SS refers to a search space monitored by a PUR UE to receive downlink feedback information (information on HARQ operation), UL grant DCI, DL assignment DCI, etc. after PUR transmission.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

The cell search process of the UE may be summarized as follows.
  1st step (related to PSS): Acquisition of SS/PBCH block (SSB) symbol timing and detection of cell ID within cell ID group (3 hypothesis)
  2nd step (related to SSS): detection of cell ID group (336 hypothesis)
  3rd step (related to PBCH DMRS): SSB index and half frame (HF) index (slot and frame boundary detection)
  4th step (related to PBCH): Acquisition of time information (80 ms, system frame number (SFN), SSB index, HF), remaining minimum system information (RMSI), control resource set (CORESET)/search space configuration
  5th step (related to PDCCH and PDSCH): Reception of cell access information and RACH configuration There may be 336 cell ID groups, and each cell ID group may have three cell IDs. There may be 1008 cell IDs in total. Information about a cell ID group to which the cell ID of a cell belongs may be provided/obtained by/from an SSS of the cell, and information about a cell among 336 cells in the cell ID may be provided/obtained by/from a PSS.

There may be 336 cell ID groups, and each cell ID group may have three cell IDs. There may be 1008 cell IDs in total. Information about a cell ID group to which the cell ID of a cell belongs may be provided/obtained by/from an SSS of the cell, and information about a cell among 336 cells in the cell ID may be provided/obtained by/from a PSS.

SSBs are periodically transmitted with an SSB periodicity. A default SSB periodicity assumed by the UE in initial cell search is defined as 20 ms. After cell access, the SSB periodicity may be set to one of {5 ms, 10 ms, 20 ms, 40 ms, 80 ms, and 160 ms} by the network (e.g., BS). An SSB burst set may be configured at the beginning of the SSB periodicity. The SSB burst set may be set to a time window of 5 ms (i.e., half-frame), and the SSB may be repeatedly transmitted up to L times within the SS burst set. The maximum number of SSB transmissions L may be given depending carrier frequency bands as follows. One slot includes up to two SSBs.
  For frequency range up to 3 GHz, L=4
  For frequency range from 3 GHz to 6 GHz, L=8
  For frequency range from 6 GHz to 52.6 GHz, L=64

The time-domain positions of candidate SSBs in the SS burst set may be defined depending on subcarrier spacings. The time-domain positions of the candidate SSBs are indexed from (SSB indices) 0 to L−1 in temporal order within the SSB burst set (i.e., half-frame).

Multiple SSBs may be transmitted within the frequency span of a carrier. Each SSB may not need to have a unique physical layer cell identifier, but different SSBs may have different physical layer cell identifiers.

The UE may acquire DL synchronization by detecting the SSB. The UE may identify the structure of the SSB burst set based on the detected SSB (time) index, and thus the UE may detect a symbol/slot/half-frame boundary. The frame/half-frame number to which the detected SSB belongs may be identified based on system frame number (SFN) information and half-frame indication information.

Specifically, the UE may obtain a 10-bit SFN for a frame to which a PBCH belongs from the PBCH. Then, the UE may obtain 1-bit half-frame indication information. For example, when the UE detects a PBCH in which the half-frame indication bit is set to 0, the UE may determine that an SSB to which the PBCH belongs is included in the first half-frame of the frame. When the UE detects the PBCH in which the half-frame indication bit is set to 1, the UE may determine that the SSB to which the PBCH belongs is included in the second half-frame of the frame. Finally, the UE may obtain the SSB index of the SSB to which the PBCH belongs based on a DMRS sequence and a PBCH payload carried by the PBCH.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
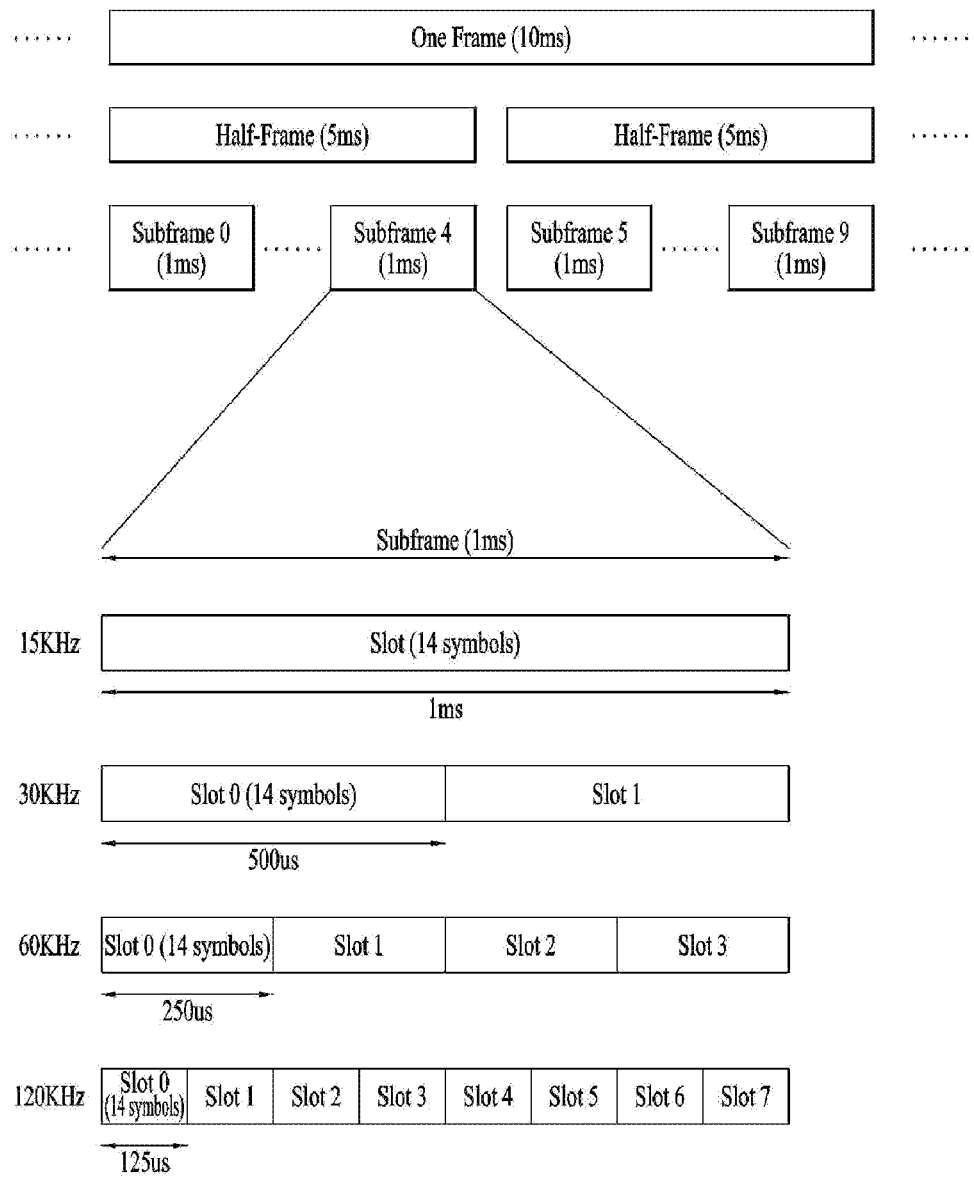
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame, u}_{slot}$: Number of slots in a frame
* $N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
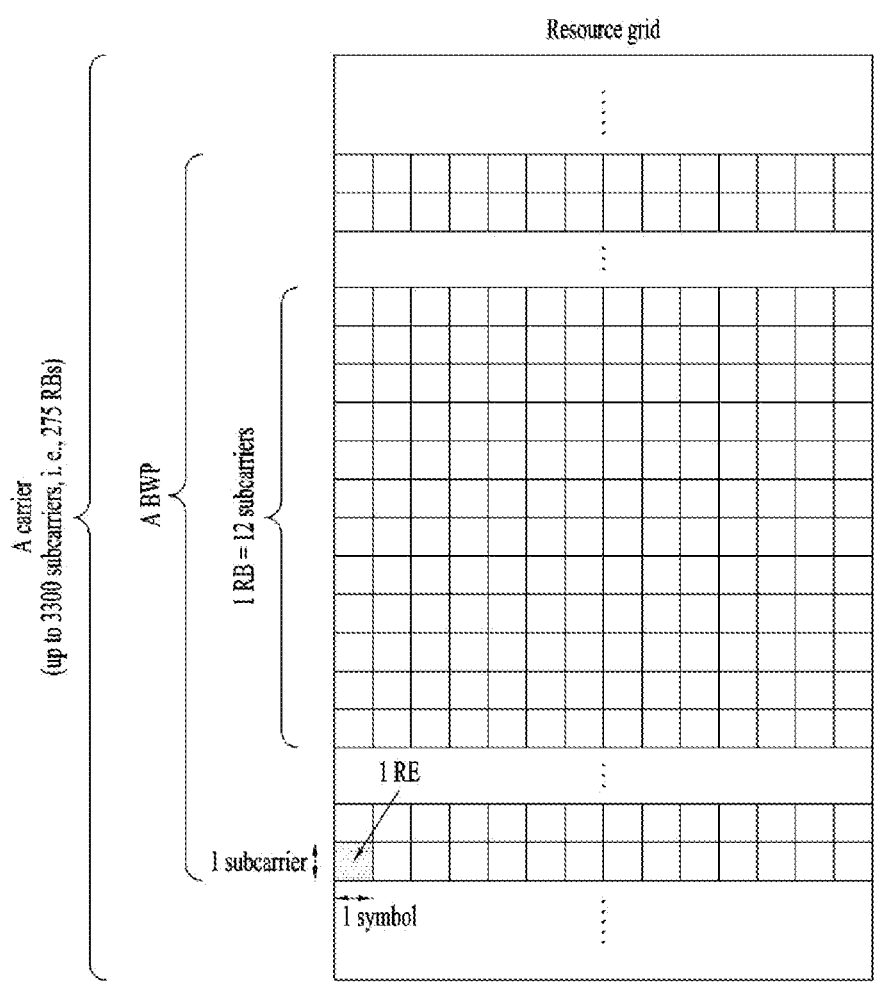
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
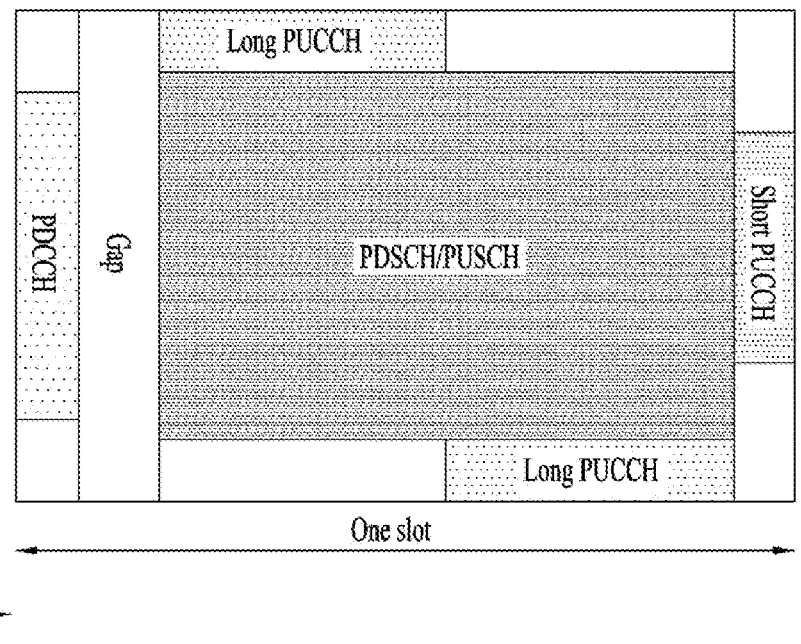
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

A BS may transmit a control resource set (CORESET) configuration to a UE. A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.
frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
duration: indicates the time resources of the CORESET. Duration indicates the number of consecutive OFDM symbols included in the CORESET. Duration has a value of 1 to 3.
cce-REG-MappingType: indicates a control channel element (CCE)-REG mapping type. Interleaved and non-interleaved types are supported.
interleaverSize: indicates an interleaver size.
pdcch-DMRS-ScramblingID: indicates a value used for PDCCH DMRS initialization. When pdcch-DMRS-ScramblingID is not included, the physical cell ID of a serving cell is used.
precoderGranularity: indicates a precoder granularity in the frequency domain.
reg-BundleSize: indicates an REG bundle size.
tci-PresentInDCI: indicates whether a transmission configuration index (TCI) field is included in DL-related DCI.
tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE. The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
controlResourceSetId: indicates a CORESET associated with the SS.
monitoringSlotPeriodicityAndOffset: indicates a periodicity (in slots) and offset (in slots) for PDCCH monitoring.
monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
nrofCandidates: indicates the number of PDCCH candidates (one of values 0, 1, 2, 3, 4, 5, 6, and 8) for each AL where AL={1, 2, 4, 8, 16}.
searchSpaceType: indicates common search space (CSS) or UE-specific search space (USS) as well as a DCI format used in the corresponding SS type.

Subsequently, the BS may generate a PDCCH and transmit the PDCCH to the UE, and the UE may monitor PDCCH candidates in one or more SSs to receive/detect the PDCCH. An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |

TABLE 4-continued

| DCI format | Usage |
| --- | --- |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

PDSCH carries downlink data (e.g., DL-SCH transport block, DL-SCH TB). The modulation scheme such as Quadrature Phase Shift Keying (QPSK), 16 Quadrature Amplitude Modulation (QAM), 64 QAM, or 256 QAM is applied to the PDSCH. A codeword is generated by encoding the TB. The PDSCH can carry up to two codewords. Scrambling and modulation mapping are performed for each codeword, and modulation symbols generated from each codeword may be mapped to one or more layers. Each layer is mapped to resources along with a demodulation reference signal (DMRS), is generated as an OFDM symbol signal, and is transmitted through a corresponding antenna port.

PUCCH carries Uplink Control Information (UCI). UCI may include one or more of following information:

SR (Scheduling Request): Information used to request a UL-SCH resource.

HARQ (Hybrid Automatic Repeat reQuest)-ACK (Acknowledgment): It is a response to a downlink data packet (e.g., codeword) on the PDSCH, and indicates whether the downlink data packet has been successfully received. 1 bit of HARQ-ACK may be transmitted in response to a single codeword, and 2 bits of HARQ-ACK may be transmitted in response to two codewords. The HARQ-ACK response includes positive ACK (simply, ACK), negative ACK (NACK), DTX or NACK/DTX. Here, HARQ-ACK may be called as HARQ ACK/NACK and ACK/NACK.

CSI (Channel State Information): feedback information for a downlink channel. Multiple Input Multiple Output (MIMO)-related feedback information includes a Rank Indicator (RI) and a Precoding Matrix Indicator (PMI).

Table 5 shows PUCCH formats. According to PUCCH length, PUCCH formats can be classified as Short PUCCH (format 0, 2) and Long PUCCH (format 1, 3, 4).

TABLE 5

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUSCH carries uplink data (e.g., UL-SCH transport block, UL-SCH TB) and/or uplink control information (UCI). PUCCH is transmitted based on a CP-OFDM (Cyclic Prefix-Orthogonal Frequency Division Multiplexing) waveform or a Discrete Fourier Transform-spread-Orthogonal Frequency Division Multiplexing (DFT-s-OFDM) waveform. When the PUSCH is transmitted based on the DFT-s-OFDM waveform, the UE performs transform precoding for the PUSCH. For example, if transform precoding is not performed (e.g., transform precoding is disabled), the UE transmits a PUSCH based on the CP-OFDM waveform. If transform precoding is performed (e.g., transform precoding is enabled), the UE transmits the PUSCH based on a CP-OFDM waveform or a DFT-s-OFDM waveform. PUSCH transmission is dynamically scheduled by a UL grant in DCI (e.g., Layer 1 (PDCCH) signaling), and/or semi-statically scheduled based on higher layer (e.g., RRC) signaling (configured grant). PUSCH transmission may be performed on a codebook-based or non-codebook-based basis.

Figure 5:
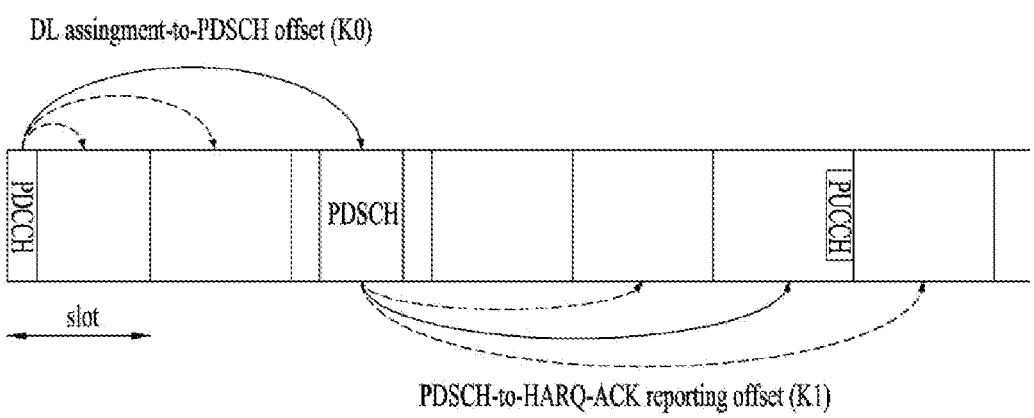
FIG. 5 illustrates an example of a physical downlink shared channel (PDSCH) transmission/reception procedure.

FIG. 5 illustrates an example of a PDSCH transmission/reception procedure. Referring to FIG. 5, the UE may detect the PDCCH in slot #n. Here, the PDCCH includes downlink scheduling information (e.g., DCI formats 1_0, 1_1), and the PDCCH indicates a DL assignment-to-PDSCH offset (K0) and a PDSCH-HARQ-ACK reporting offset (K1). For example, DCI formats 1_0 and 1_1 may include the following information:

Frequency domain resource assignment (FDRA): FDRA indicates the RB set allocated to the PDSCH.

Time domain resource assignment (TDRA): TDRA indicates K0 (e.g., slot offset), the starting position (e.g., OFDM symbol index) of the PDSCH within slot #n+K0, and the length of the PDSCH (e.g., the number of OFDM symbols).

PDSCH-to-HARQ_feedback timing indicator, which indicates K1 (e.g., slot offset)

HARQ process number (4 bits), which indicates the HARQ process ID (Identity) for data (e.g., PDSCH, TB)

PUCCH resource indicator (PRI): PRI indicates a PUCCH resource to be used for UCI transmission among a plurality of PUCCH resources in the PUCCH resource set The UE receives the PDSCH in slot #(n+K0) based on the scheduling information received in slot #n. After completion of the PDSCH reception in slot #n1 (where, n+K0≤n1), the UE may transmit UCI through PUCCH from slot #(n1+K1).

Here, the UCI may include a HARQ-ACK response for the PDSCH. In FIG. 5, for convenience, it is assumed that the SCS for the PDSCH and the SCS for the PUCCH are the same, and it is assumed that slot #n1=slot #n+K0, but the present disclosure is not limited thereto. If the SCSs are different, K1 may be indicated/interpreted based on the SCS of the PUCCH.

If the PDSCH is configured to carry a maximum of 1 TB, the HARQ-ACK response may have 1-bit. When the PDSCH is configured to carry a maximum of 2 TBs, the HARQ-ACK response may be configured with 2-bits when spatial bundling is not configured, and may be configured with 1-bits when spatial bundling is configured. When the HARQ-ACK transmission time for the plurality of PDSCHs is configured as slot #(n+K1), the UCI transmitted in the slot #(n+K1) includes HARQ-ACK responses for the plurality of PDSCHs.

Whether the UE should perform spatial bundling for the HARQ-ACK response may be configured for each cell group (e.g., RRC/higher layer signaling). As an example, spatial bundling may be individually configured in each of the HARQ-ACK response transmitted through the PUCCH and/or the HARQ-ACK response transmitted through the PUSCH.

Spatial bundling may be supported when the maximum number of TBs (or codewords) that can be received at one time in the corresponding serving cell (or schedulable through 1 DCI) is two (or two or more) (e.g., higher layer parameter maxNrofCodeWordsScheduledByDCI is equal to 2-TB). Meanwhile, a number of layers greater than four may be used for 2-TB transmission, and a maximum of four layers may be used for 1-TB transmission. As a result, when spatial bundling is configured in a corresponding cell group, spatial bundling may be performed on a serving cell that can schedule more than four layers among serving cells in the corresponding cell group. On a corresponding serving cell, a UE desiring to transmit a HARQ-ACK response through spatial bundling may generate a HARQ-ACK response by performing (bit-wise) logical AND operation on ACK/NACK (A/N) bits for a plurality of TBs.

For example, assuming that the UE receives DCI for scheduling 2-TB and receives 2-TB through the PDSCH based on the DCI. If spatial bundling is performed, a single A/N bit may be generated by performing a logical AND operation on the first A/N bit for the first TB and the second A/N bit for the second TB. As a result, if both the first TB and the second TB are ACKs, the UE reports the ACK bit value to the BS, and when either TB is NACK, the UE reports the NACK bit value to the BS.

For example, when only a 1-TB is actually scheduled on a serving cell in which 2-TB reception is allowed, the UE may generate a single A/N bit by performing a logical AND operation on the A/N bit for the corresponding 1-TB and a bit value of 1. As a result, the UE may report the A/N bit for the corresponding 1-TB to the BS as it is.

A plurality of parallel DL HARQ processes can be configured for DL transmission in the base station/terminal. A plurality of parallel HARQ processes allow DL transmissions to be performed continuously while waiting for HARQ feedback on successful or unsuccessful reception of the previous DL transmission. Each HARQ process is associated with a HARQ buffer of a MAC (Medium Access Control) layer. Each DL HARQ process manages information related to the number of MAC PDU (Physical Data Unit) transmissions in the buffer, HARQ feedback for the MAC PDU in the buffer, and a current redundancy version. Each HARQ process is identified by a HARQ process ID.

Figure 6:
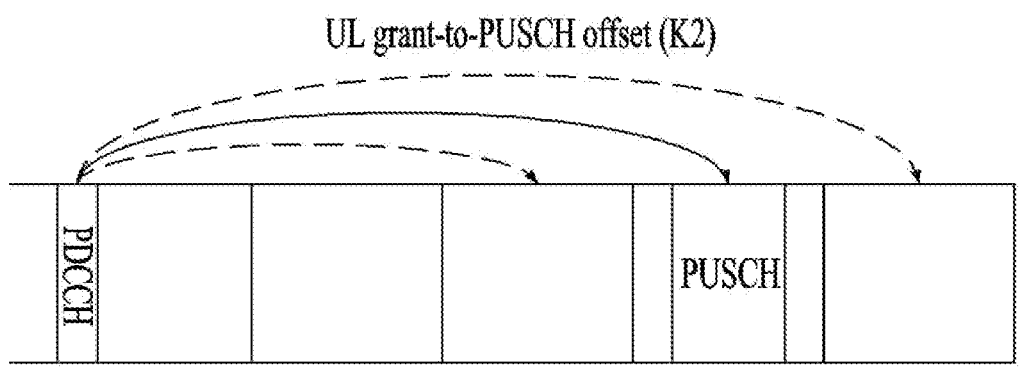
FIG. 6 illustrates an example of a physical uplink shared channel (PUSCH) transmission/reception procedure.

FIG. 6 illustrates an example of a PUSCH transmission/reception procedure. Referring to FIG. 6, the UE may detect the PDCCH in slot #n. Here, the PDCCH includes uplink scheduling information (e.g., DCI formats 0_0, 0_1). DCI formats 0_0 and 0_1 may include the following information:

Frequency domain resource assignment (FDRA), which indicates the RB set allocated to the PUSCH Time domain resource assignment (TDRA), which indicates the slot offset K2, the start position (e.g., symbol index) and length (e.g., number of OFDM symbols) of the PUSCH in the slot. The start symbol and length may be indicated through a Start and Length Indicator Value (SLIV), or may be indicated respectively.

The UE may transmit the PUSCH in slot #(n+K2) according to the scheduling information received in slot #n. The PUSCH may include a UL-SCH TB.

Random Access Procedure

Figure 7:
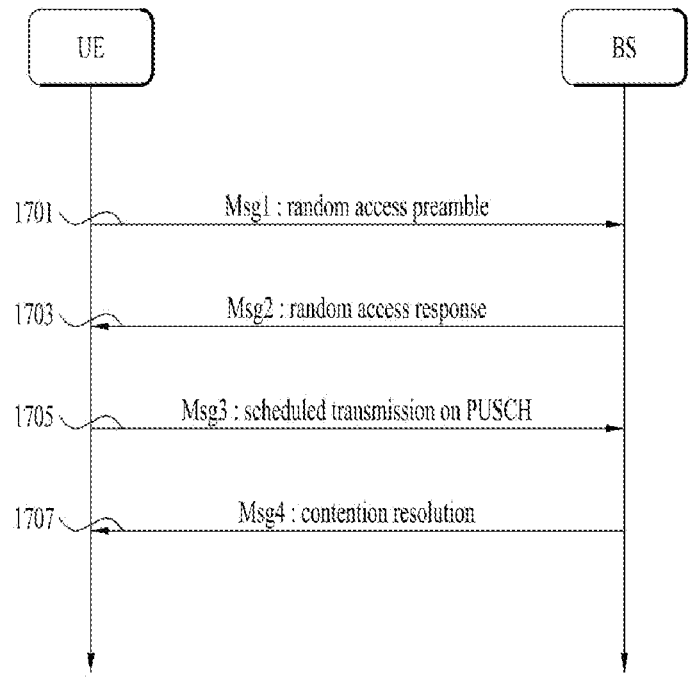
FIGS. 7 and 8 illustrate a 4-step random access channel (RACH) procedure and a 2-step RACH procedure, respectively.
Figure 7:
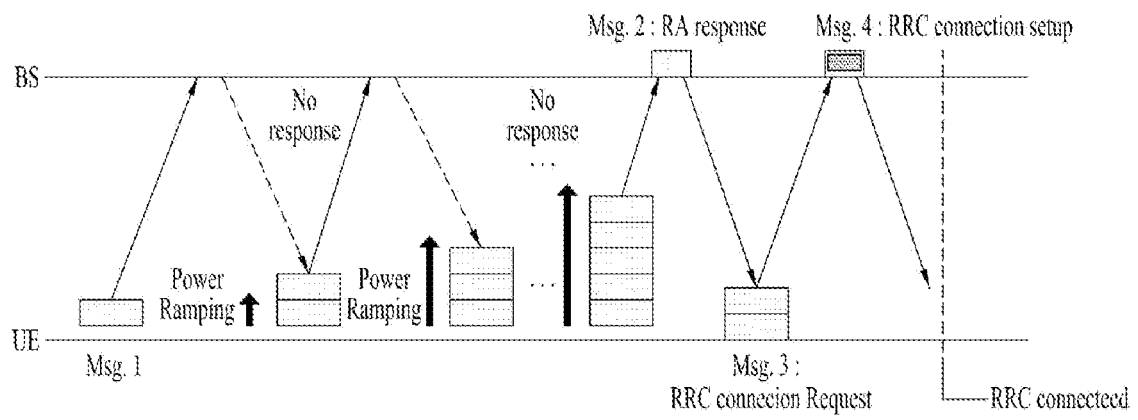

FIG. 7 illustrates an example of a normal random access procedure. Specifically, FIG. 7 shows a contention-based random access procedure of the UE, which consists of four steps.

First, the UE may transmit message 1 (Msg1) including a random access preamble on a PRACH (see 1701 of FIG. 7(*a*)).

Random access preamble sequences with two different lengths may be supported. A long sequence length of 839 may be applied to subcarrier spacings of 1.25 and 5 kHz, and a short sequence length of 139 may be applied to subcarrier spacings of 15, 30, 60, and 120 kHz.

Multiple preamble formats may be defined by one or more RACH OFDM symbols and different cyclic prefixes (and/or guard times). A RACH configuration for a cell may be included in system information about the cell and provided to the UE. The RACH configuration may include information on the subcarrier spacing of the PRACH, available preambles, preamble formats, and so on. The RACH configuration may include information about association between SSBs and RACH (time-frequency) resources. The UE transmits a random access preamble on a RACH time-frequency resource associated with a detected or selected SSB.

The threshold of an SSB for RACH resource association may be configured by the network, and a RACH preamble may be transmitted or retransmitted based on an SSB where the RSRP, which is measured based on the SSB, satisfies the threshold. For example, the UE may select one SSB from among SSBs that satisfy the threshold and transmit or retransmit the RACH preamble based on a RACH resource associated with the selected SSB.

Upon receiving the random access preamble from the UE, the BS may transmit message 2 corresponding to a random access response (RAR) message to the UE (see 1703 of FIG. 7(*a*)). A PDCCH scheduling a PDSCH carrying the RAR may be CRC masked with a random access (RA) radio network temporary identifier (RNTI) (RA-RNTI) and then transmitted. Upon detecting the PDCCH masked by the RA-RNTI, the UE may obtain the RAR from the PDSCH scheduled by DCI carried by the PDCCH. The UE may check whether the RAR includes RAR information in response to the preamble transmitted by the UE, i.e., Msg1. The presence or absence of the RAR information in response to Msg1 transmitted by the UE may be determined depending on whether there is a random access preamble ID for the preamble transmitted by the UE. If there is no response to Msg1, the UE may retransmit the RACH preamble within a predetermined number of times while performing power ramping. The UE may calculate PRACH transmit power for retransmitting the preamble based on the most recent path loss and power ramping counter.

The RAR information transmitted on the PDSCH may include timing advance (TA) information for UL synchronization, an initial UL grant, and a temporary cell-RNTI (C-RNTI). The TA information may be used to control a UL signal transmission timing. The UE may transmit a UL signal over a UL shared channel as message 3 (Msg3) of the random access procedure based on the RAR information (see 1705 of FIG. 7(*a*)). Msg3 may include an RRC connection request and a UE identifier. In response to Msg3, the network may transmit message 4 (Msg4), which may be treated as a contention resolution message on DL (see 1707 of FIG. 7(*a*)). Upon receiving Msg4, the UE may enter the RRC_CONNECTED state.

On the other hand, a contention-free random access procedure may be performed when the UE is handed over to another cell or BS or when it is requested by the BS. In the contention-free random access procedure, a preamble to be used by the UE (hereinafter referred to as a dedicated random access preamble) is allocated by the BS. Information on the dedicated random access preamble may be included in an RRC message (e.g., handover command) or provided to the UE through a PDCCH order. When the random access procedure is initiated, the UE may transmit the dedicated random access preamble to the BS. When the UE receives an RAR from the BS, the random access procedure is completed.

As described above, a UL grant in the RAR may schedule PUSCH transmission to the UE. A PUSCH carrying initial UL transmission based on the UL grant in the RAR is referred to as an Msg3 PUSCH. The content of an RAR UL grant may start at the MSB and end at the LSB, and the content may be given as shown in Table 6.

TABLE 6

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 0 |
| CSI request | 1 |

In the contention-free random access procedure, a CSI request field in the RAR UL grant may indicate whether the UE needs to include an aperiodic CSI report in corresponding PUSCH transmission. The subcarrier spacing for Msg3 PUSCH transmission may be provided by an RRC parameter. It is expected that the UE may transmit the PRACH and the Msg3 PUSCH on the same UL carrier of the same serving cell. The UL BWP for the Msg3 PUSCH transmission may be indicated by system information block 1 (SIB1).

Figure 8:
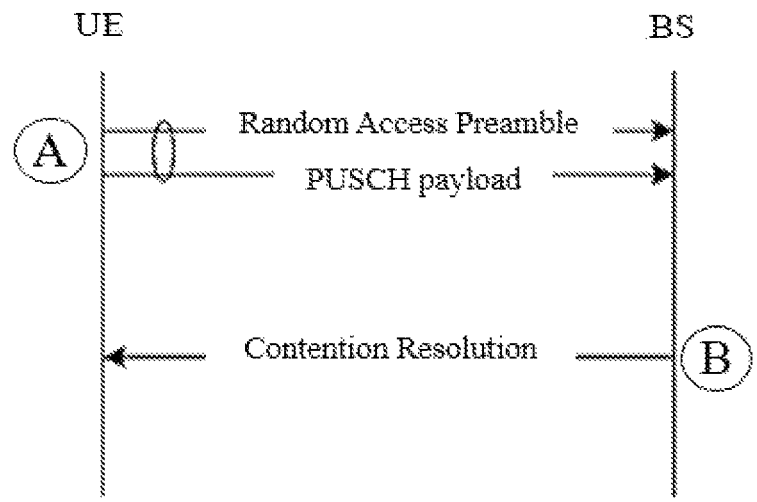
Figure 8:
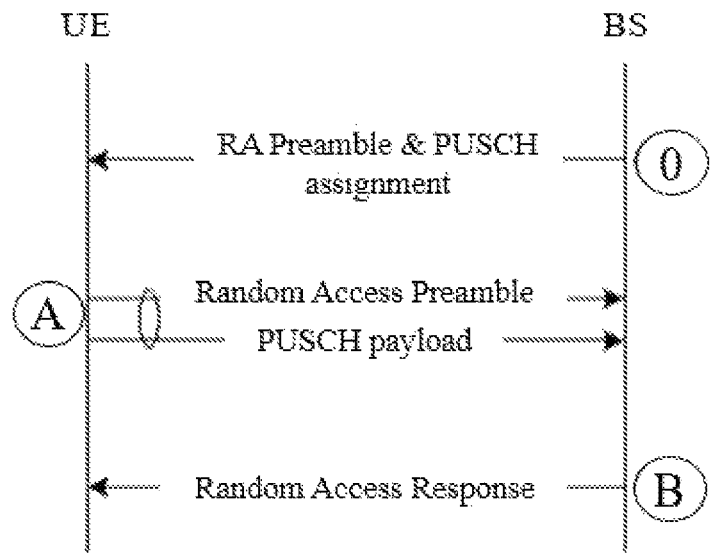

FIG. 8 is a diagram for explaining a 2-step RACH procedure. Specifically, FIG. 8(*a*) shows contention-based random access (CBRA), and FIG. 8(*b*) shows contention-free random access (CFRA).

In FIG. 8, message A (MSGA) includes a preamble and a payload (PUSCH payload). The preamble and payload may be multiplexed by time division multiplexing (TDM). In addition, message B (MSGB) may be transmitted for contention resolution, fallback indication(s), and/or backoff indication(s) as a response to MSGA.

Configured Grant (CG)

In conventional Rel. 16, a CG is supported only for UEs in the RRC_CONNECTED state. For the BWP of a serving cell, the UE may be configured with up to 12 active CGs.

Each CG may have Type 1 or Type 2. Activation/deactivation of a Type-1 CG may be performed independently between serving cells. When a plurality of Type-2 CGs are configured, activation of each Type-2 CG may be separately performed by DCI. One DCI may inactivate one Type-2 CG or inactivate a plurality of Type-2 CGs.

For CG-based transmission on NR-U (i.e., shared spectrum channel access), configured grant uplink control information (CG-UCI) may be transmitted on a corresponding CG PUSCH (i.e., PUSCH scheduled by a CG). Multiplexing between CG-UCI and a PUCCH carrying a HARQ-ACK on NR-U may be configured/allowed by the BS. As a case where the multiplexing between the CG-UCI and the PUCCH carrying the HARQ-ACK is not configured, the PUCCH carrying the HARQ-ACK may overlap with the CG PUSCH in a PUCCH group. In this case, transmission of the CG PUSCH may be dropped.

In conventional Rel. 16, the number of HARQ processes for the CG is indicated by an RRC configuration. The number of HARQ processes is shared between CG-based transmission and dynamic grant-based transmission. After the CG-based transmission, the UE monitors whether there is a retransmission request from the BS for a predetermined period of time (e.g., during a timer configured for the corresponding HARQ process). When the timer expires, the UE considers that the CG-based transmission is successful. If the BS fails to receive on a CG resource, the BS sends a retransmission request to the UE. The retransmission request for the CG is transmitted over a PDCCH, which is CRC scrambled by a configured grant (CS)-RNTI. Depending on whether the value of a new data indicator (NDI) field included in DCI carried on the PDCCH is toggled, the UE may perform the CG retransmission. For example, if there is no change in the NDI value, the UE retransmits the previously transmitted CG-PUSCH on a UL resource scheduled by the corresponding DCI based on dynamic scheduling (DCI).

At least some of the above-described CG procedures of Rel. 16 may be used for CG-based small data transmission (SDT), which will be described later unless stated otherwise.

Configured Grant Resource & Retransmission Resource for Idle/Inactive UE

NR supports the RRC_IDLE state as well as the RRC_INACTIVE state. When the UE transmits infrequent (periodic and/or non-periodic) data, the BS may instruct the UE to stay in the RRC_INACTIVE state. Since data transmission in the RRC_INACTIVE state is not supported until Rel-16, the UE needs to resume an RRC connection, that is, transition to the RRC_CONNECTED state in order to transmit UL (mobile originated) and/or DL (mobile terminated) data. Since a connection setup for data transmission and subsequent processes of returning to the RRC_INACTIVE state are absolutely necessary regardless of the size of the data to be transmitted, the connection setup and subsequent processes may cause unnecessary power consumption and signaling overhead. This issue may become particularly serious when the size of data to be transmitted is small and the transmission is infrequent (e.g., SDT). At least some of the situations shown in Table 7 below may be considered as the case where the size of data is small and transmission is infrequent, but the present disclosure is not limited thereto.

TABLE 7

| # Smartphone applications: |
| --- |
| Traffic from Instant Messaging(IM) services |
| Heart-beat/keep-alive traffic from IM/e-mail clients and other apps |
| Push notifications from various applications |
| # Non-smartphone applications: |
| Traffic from wearables (periodic positioning information, etc.) |
| Sensors (Industrial Wireless Sensor Networks transmitting temperature, pressure readings periodically or in an event triggered manner, etc.) |
| Smart meters and smart meter networks sending periodic meter readings |

When the UE performs an SDT RACH procedure or SDT CG transmission in the inactive state, the BS may reconfigure a UE-dedicated SDT SS configuration.

B. SDT related CG Configuration

The BS may configure an SDT related CG in an RRC Release message. For example, the BS may allocate at least one CG configuration index and configure a CG Type 1 resource for each CG configuration index as shown in Table 8. In CG Type 1, the CG may be activated as long as the UE receives the RRC Release message. Meanwhile, the BS may configure CG Type 2 in the RRC Release message. In this case, the CG may be activated after the UE receives activation DCI. Table 8 shows a CG Type 1 resource configuration for one CG configuration index (extracted from TS 38.331).

TABLE 8

| rrc-ConfiguredUplinkGrant | SEQUENCE { |
| --- | --- |
| timeDomainOffset | INTEGER (0..5119), |
| timeDomainAllocation | INTEGER (0..15), |
| frequencyDomainAllocation | BIT STRING (SIZE(18)), |
| antennaPort | INTEGER (0..31), |
| dmrs-SeqInitialization | INTEGER (0..1) |
| precodingAndNumberOfLayers | INTEGER (0..63), |
| srs-ResourceIndicator | INTEGER (0..15) |
| mcsAndTBS | INTEGER (0..31), |
| frequencyHoppingOffset | INTEGER (1.. maxNrofPhysicalResourceBlocks−1) |
| pathlossReferenceIndex | INTEGER (0..maxNrofPUSCH-PathlossReferenceRSs−1), |
| ..., | |
| [[ | |
| pusch-RepTypeIndicator-r16 | ENUMERATED {pusch-RepTypeA,pusch-RepTypeB} |
| frequencyHoppingPUSCH-RepTypeB-r16 | ENUMERATED {interRepetition, interSlot} |
| timeReferenceSFN-r16 | ENUMERATED {sfn512} |
| ]] | |
| } | |

In Rel. 17 NR standardization, a method for a UE to transmit SDT UL data based on a CG (in the RRC_IDLE/INACTIVE state) is under discussion. When CG-SDT is supported, the BS may not know which SSB is related to a CG PUSCH transmitted by an SDT UE for SDT transmission. As a result, in case of SDT reception failure, the BS may not know which SSB is related to a CORESET in which the BS needs to provide/indicate SDT retransmission resources to the UE. To address this issue, the present disclosure proposes RACH-based SDT and/or CG-SDT in various embodiments.

Figure 9:
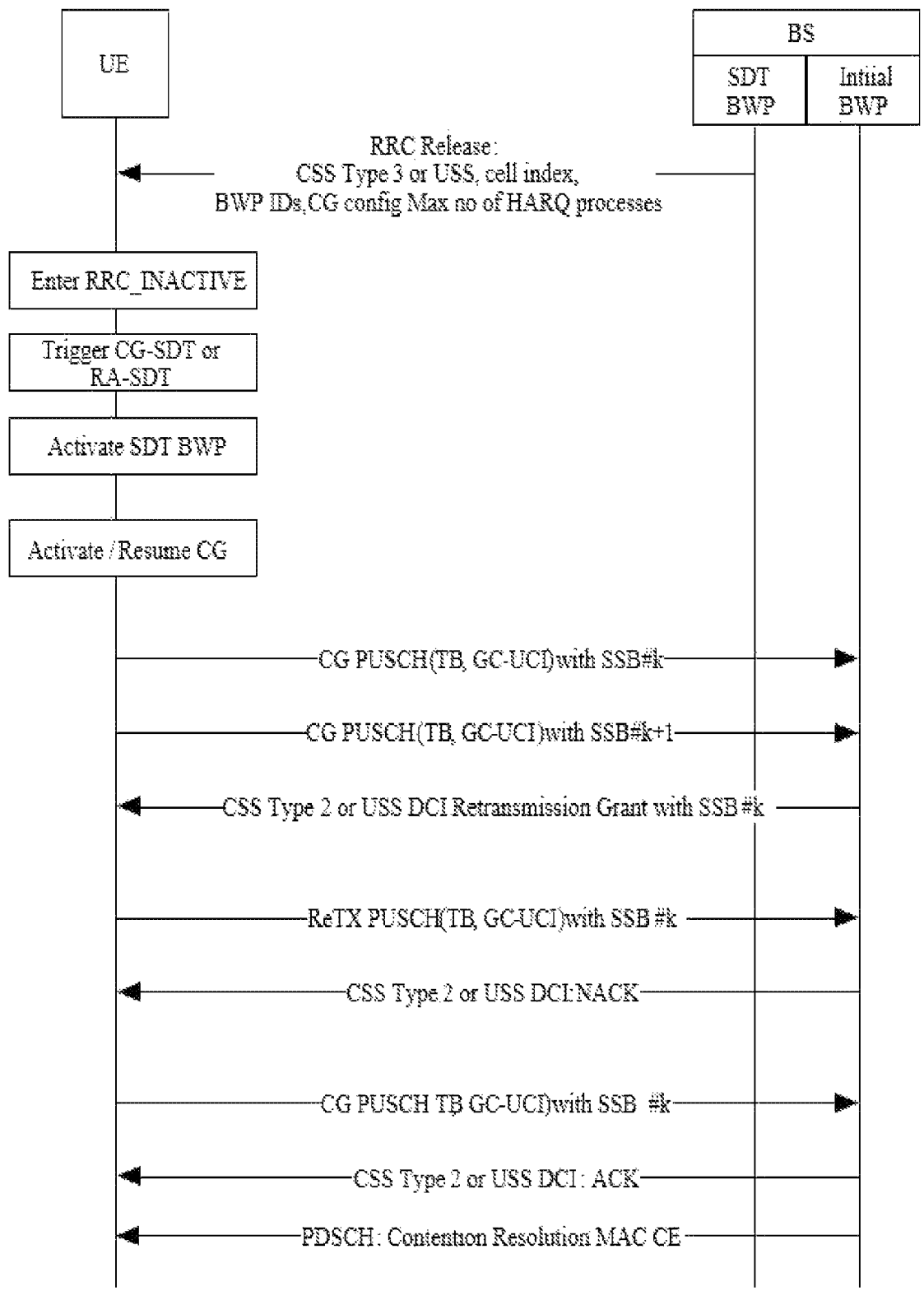
FIG. 9 illustrates a RACH and configured grant (CG) based small data transmission (SDT) uplink (UL) transmission according to an embodiment of the present disclosure.

FIG. 9 illustrates RACH and/or CG-based SDT UL (re) transmission according to an embodiment of the present disclosure.

(1). The UE in the RRC_CONNECTED state may switch to the RRC_INACTIVE state by receiving an RRC Release message indicating suspension. In this case, a UE-dedicated (RRC) message may include information on at least one SDT configuration as follows. The UE-dedicated message may be equivalent to the RRC Release message or an RRC Reconfiguration message received by the UE before the RRC Release message.

A. At Least One SDT Search Space

The BS may provide at least one search space (SS) configuration for SDT. For example, the UE may be allocated CSS Type 3 or at least one USS available in the inactive state. If the UE receives no SDT SS configuration in the UE-dedicated message, the UE may obtain/store a CSS type of SDT SS configuration from system information on the serving cell in the RRC_INACTIVE state.

An SDT CG resource may be mapped to each CG configuration index, or an RS may be mapped to at least one HARQ process ID with one CG configuration index. For example, when a plurality of CG configurations are supported, different CG resources mapped to different CG configuration indices may be mapped to different RSs. Alternatively, different CG resources, which are mapped to different HARQ process IDs with one CG configuration index, may be mapped to different RSs.

Different CG resources mapped to different HARQ process IDs of one CG configuration index may be mapped to different RSs. For example, a CG resource mapped to HARQ process ID=1 may be configured to be mapped to ssb-index=1 and 2, and a CG resource mapped to HARQ process ID=2 may be configured to be mapped to ssb-index=3 and 4. Alternatively, HARQ process IDs of 1 and 3 may be configured to be mapped to SSB index=1, and HARQ process IDs of 2 and 4 may be configured to be mapped to SSB index=2. The HARQ process ID to SSB index mapping may be configured in the RRC Release message or system information.

In an embodiment of the present disclosure, the BS may configure CG-SDT where only some SSB(s) in a cell are mapped to a CG-PUSCH for a single UE. For example, a stationary UE may be configured with specific/some SSB(s) in a RRC Release message or over the RACH. If SDT is not allowed in the specific/partial SSB(s) (e.g., invalid beam), the UE may switch to RA-SDT and trigger the RACH as described below. For example, the UE may trigger a contention-based RACH with the optimal SSB. On the other hand, when the BS detects such a problem, the BS may trigger a contention-free RACH with DCI. In this case, the CRC of the DCI may be scrambled by a C-RNTI or CS-RNTI.

The BS may configure a mapping relationship between SDT CG configuration indices and SDT logical channels. In this case, the UE may be configured to transmit specific logical channel data only on a CG resource with a SDT CG configuration index mapped thereto.

C. SDT Related UE-Specific RNTI

The BS may instruct the UE to continue using a C-RNTI, which has been used in the RRC_CONNECTED state, in the RRC_INACTIVE state or may allocate a new UE-specific RNTI (e.g., C-RNTI of a different value). If the UE performs SDT CG transmission in the inactive state, the BS may reconfigure the UE-specific RNTI.

When the BS instructs the UE to use the C-RNTI in the inactive state, the UE may apply the C-RNTI to SDT. In this case, the UE may apply the corresponding C-RNTI only to a cell index indicated by the BS. When the UE reselects another cell in the inactive state after leaving a cell of the cell index, the UE may discard the corresponding C-RNTI.

For SDT CG retransmission, the BS may allocate a CS-RNTI to the UE. When an SDT related CS-RNTI is configured, the UE may monitor a PDCCH for CG retransmission resources after initial CG transmission. The UE may receive DCI allocating retransmission resources CRC scrambled by the CS-RNTI over the PDCCH.

D. Number of HARQ Processes for SDT CG

The BS may configure the number of HARQ processes for SDT CG in a UE-dedicated message or system information. The UE may map CG resources to HARQ process IDs depending on the number of HARQ processes. The CG resources may be allocated periodically. Thus, for example, if N HARQ process IDs are configured, one HARQ process ID may be allocated in each CG resource cycle, and the next HARQ process ID may be allocated in the next cycle. In this way, one of the N HARQ process IDs may be allocated such that the one HARQ process ID is repeated once for each of the N CG resource cycles.

Alternatively, the UE may report the maximum number of HARQ processes to the BS as capability, and the BS may manage as many HARQ processes for SDT CG transmission as the reported number.

E. Cell Index for SDT

The BS may provide a separate SDT BWP ID in a UE-dedicated message or system information.

The UE may apply the SDT configuration information only to a cell indicated by a cell index and perform SDT only for the indicated cell.

F. UL/DL BWP Configuration for SDT

The BS may provide at least one separate SDT BWP ID in a UE-dedicated message or system information. In addition, the BS may provide detailed configurations such as the PRB and SCS for each SDT BWP.

The SDT BWP ID may be applied to a cell index. Accordingly, the UE may apply the SDT configuration information to the SDT BWP ID of the indicated cell index. That is, SDT may be performed only in a UL/DL BWP indicated by the BWP ID.

If no separate SDT BWP ID is configured in the UE-dedicated message, the UE may configure the SDT BWP ID by receiving the system information in the inactive state. In this case, if it is indicated by the system information that a cell of the cell index supports the SDT and no separate SDT BWP ID is configured by the system information, the UE may perform the SDT in the initial BWP.

(2). Upon receiving the RRC Release message, the UE may perform cell selection or cell reselection after entering the RRC_INACTIVE mode. In this case, the UE may preferentially select a cell in which SDT configuration information in the RRC Release message is supported. For example, the priority of the frequency of a cell indicated by a cell index may be set to the highest, and an offset may be added to the quality of the cell indicated by the cell index, whereby the corresponding cell may be preferentially selected. In this case, the offset may be configured by the BS in a UE-dedicated message such as the RRC Release message.

A. When the cell of the cell index in which the SDT configuration information in the RRC Release message is supported is selected, if the quality of the corresponding cell is more than or equal to a threshold, a time alignment timer (TAT) for SDT may be (re)started. On the other hand, when a cell in which the SDT configuration information is not supported (e.g., a cell not indicated by the cell index) is selected, if the quality of the cell of the cell index is less than or equal to the threshold, the TAT for SDT may be stopped or may not be (re)started.

(3). When at least one of the conditions of Table 9 is satisfied, the inactive UE may perform SDT CG transmission after triggering the RACH for SDT. However, the present disclosure is not limited thereto.

TABLE 9

When no CG for SDT is assigned
When a CG for SDT is released/deactivated/suspended
When a TAT expires, does not start, or is not running
When there is data on an SDT logical channel not mapped to a SDT CG
When the quality of a serving cell is below a threshold indicated by the BS
When the measurement value of an SSB mapped to the SDT CG is below the threshold
If the speed of the UE is higher than a predetermined level For example, even when the UE receives information on CG resources for SDT in the RRC Release message, if the quality of an SSB mapped to an (activated) CG resource is below a threshold, the UE may trigger an SDT related RACH or select another (activated) CG resource. If the quality of an SSB mapped to the other (activated) CG resource is more than or equal to the threshold, the UE may transmit SDT UL data on the corresponding CG resource. If the quality of the SSB mapped to the other (activated) CG resource is less than or equal to the threshold and if there are no other (activated) CG resources configured for the UE, the UE may trigger the RACH.

Alternatively, even when the quality of the SSB mapped to the (activated) CG resource is above the threshold, if the TAT expires, the UE may trigger the RACH.

When the RACH is triggered, the UE may transmit a RACH preamble by selecting one SDT BWP included in SDT configuration information and then activating the corresponding UL BWP.

If an SDT CG is released/deactivated/suspended and there is SDT UL data, the UE may trigger the RACH. For example, when an SDT related CG configuration index is mapped to a CG Type 1 resource, the UE may activate a CG resource of the corresponding CG configuration index upon receiving the RRC release message. When the CG resource is activated, the UE may transmit the SDT UL data on the corresponding CG resource (at any time). However, when the TAT expires in the inactive mode, when the UE moves to a new cell after leaving a serving cell indicated by a cell index, or when the (SDT related) RACH is triggered according to the above-described conditions, the UE may release, deactivate, or suspend the corresponding CG configuration. In general, since CG Type 1 is incapable of being deactivated, the UE may suspend the corresponding CG configuration. If the SDT CG is CG Type 2, the UE may release/deactivate CG Type 2. The CG resource corresponding to the released/deactivated/suspended SDT CG configuration may not be used for SDT UL data transmission at least temporarily. Therefore, in this case, if the SDT UL data is generated, the UE may trigger the RACH.

If a UE-dedicated preamble for the SDT CG is included in an SDT RACH configuration and if the measurement result (e.g., SSB/CSI-RS measurement result) of a signal to which the corresponding preamble is mapped is more than or equal to a threshold, the UE may start a contention-free RACH by transmitting the corresponding UE-dedicated preamble on a RACH occasion (RO) included in the SDT RACH configuration. When the contention-free RACH is triggered, the UE may transmit the UE-dedicated preamble, monitor a PDCCH in an SDT SS, and receive MSG2 DCI, which is CRC scrambled by a C-RNTI, in the SDT SS. The C-RNTI may be a C-RNTI used by the UE in the connected mode or a C-RNTI received in the RRC Release message. The MSG2 DCI may allocate SDT PUSCH resources or indicate CG Type 2 activation or CG Type 1 resume for the SDT CG configuration index.

However, if the measurement result (e.g., SSB/CSI-RS measurement result) of the signal to which the UE-dedicated preamble is mapped is below the threshold and if an SDT CG-dedicated preamble is included in the SDT RACH configuration, the UE may perform a contention-based RACH by using based the SDT CG-dedicated preamble on the RO included in the SDT RACH configuration. In this case, if the measurement result (e.g., SSB/CSI-RS measurement result) of a signal to which the SDT CG-dedicated preamble is mapped is more than or equal to the threshold, the UE may transmit the RACH preamble by selecting the corresponding SDT CG-dedicated preamble. Here, the SDT CG-dedicated preamble may be a preamble mapped to at least one SDT CG configuration index or a preamble mapped to all SDT CGs.

If the measurement result (e.g., SSB/CSI-RS measurement result) of the signal to which the SDT CG-dedicated preamble is mapped is not above the threshold, or if there are no SDT CG-dedicated preambles in the SDT RACH configuration, the UE may perform the RACH by selecting a general preamble. When performing PRACH transmission with the general preamble, the UE may trigger RRC connection establishment as in the prior art and transmit a RACH preamble for the RRC connection establishment.

Alternatively, when performing the PRACH transmission with the general preamble, the UE may perform SDT CG transmission according to the instruction of the BS. In this case, the CG configuration index received in the RRC Release message may be indicated in MSG2, MSG4, or MSGB of the RACH.

In summary, when a CG for SDT is allocated, when the CG for SDT is activated/resumed, when a TAT is running, when there is data in an SDT logical channel mapped to the SDT CG, when the UE is stationary or moves at a low speed, or when the quality of a serving cell or the quality of an SSB mapped to the SDT CG is more than or equal to a threshold indicated by the BS, the UE may transmit the SDT UL data on an activated SDT CG resource with no RACH. Thereafter, by monitoring an SDT SS, the UE may receive DCI allocating retransmission resources of the SDT CG or DCI indicating deactivation/release/suspension of the SDT CG.

(4). In a 4-step RACH, the UE may monitor DCI, which is CRC scrambled by an RA-RNTI or C-RNTI, after transmitting a RACH preamble. In this case, the RA-RNTI of an SDT related RACH may be determined to have a different value from the conventional RA-RNTI. Alternatively, MSG2 DCI may be monitored with an RNTI with a new value and name. In this case, the MSG2 DCI may activate or resume an SDT CG. For example, when an SDT CG configuration index is included in the MSG2 DCI, the UE may activate the corresponding SDT CG (for CG Type 2) or resume the corresponding SDT CG (for CG Type 1).

The UE may receive a MSG2 PDSCH based on the received MSG2 DCI. In this case, the MAC PDU of the MSG2 PDSCH may include the RAPID for the RACH preamble transmitted by the UE in a sub-header. The MAC PDU of the MSG2 PDSCH may also include an RAR MAC CE mapped to the sub-header. The RAR MAC CE may allocate a MSG3 PUSCH UL grant for SDT UL data transmission, a temporary C-RNTI, and a PUCCH resource. Alternatively, when a specific SDT CG configuration index is included, the SDT CG may be activated (for CG Type 2) or resumed (for CG Type 1). Alternatively, MSG3 UCI transmission may be indicated.

(5). For a 4-step RACH without CG activation/resume, the UE may transmit a first TB (i.e., MAC PDU) on a MSG3 PUSCH. If MSG2 DCI or a MSG2 RAR MAC CE indicates an SDT BWP ID, the UE may activate an indicated SDT BWP and transmit MSG3 in the activated SDT BWP. In this case, the initial BWP may be deactivated. However, if there are no indicated SDT BWPs, MSG3 may be transmitted in the initial BWP.

For a 2-step RACH, the first TB may be transmitted on a MSGA PUSCH. If an SDT BWP ID is included in SDT configuration information, the UE may activate an indicated SDT BWP and transmit MSGA in the SDT BWP. In this case, the initial BWP may be deactivated. However, if there are no indicated SDT BWPs, MSGA may be transmitted in the initial BWP.

In this case, the first TB may include a CCCH message including a UE ID and an SDT buffer status report (BSR) MAC CE. The UE ID may be a C-RNTI used by the UE in the RRC_CONNECTED mode or a C-RNTI received by the UE in the RRC Release message. Meanwhile, the logical channel ID (LCID) field of the sub-header of the first TB may indicate {CCCH+SDT} or SDT. For example, a specific code point of the LCID may indicate {CCCH+SDT} or SDT. The SDT BSR MAC CE may indicate the data size of an L2 buffer of an SDT logical channel.

On the other hand, according to the SDT configuration information, MSG2 DCI, or RAR MAC CE of the BS, the UE may transmit UCI on a PUCCH resource, a MSG3 PUSCH, or a MSGA PUSCH. The UE may request CG activation or CG resume with UCI bits. The UCI bits may indicate a CG configuration index or SDT logical channel ID suitable for SDT UL data. Alternatively, the UCI bits may indicate the traffic pattern of the SDT UL data. For example, UCI bits=000 and 001 may indicate different UL data periods, different data sizes or different quality of service (QoS). Accordingly, the BS may select a CG configuration index where the SDT UL data of the UE is matched with the traffic pattern or logical channel Meanwhile, the UE may provide the CG configuration index, the SDT logical channel ID, the traffic pattern of the SDT UL data, the data period, the data size, the QoS, etc. in a MSG3 MAC CE or MSG3 RRC message rather than the UCI.

(6). After transmitting MSG3/A, the UE may receive a HARQ retransmission resource or an ACK/NACK of MSG3 or MSGA in DCI transmitted with DCI format 0_0. In this case, the CRC of the DCI may be scrambled by a temporary C-RNTI.

In addition, after transmitting MSG3/A, the UE may receive a contention resolution MAC CE or MSGB in DCI transmitted with DCI format 1_0. The CRC of the DCI scheduling the contention resolution MAC CE is scrambled by a temporary C-RNTI of MSG2, and the CRC of the DCI scheduling MSGB may be scrambled by an MSGB-RNTI. Alternatively, the CRC of the DCI scheduling the contention resolution MAC CE is scrambled with a C-RNTI used by the UE in the RRC_CONNECTED mode, or the CRC of the DCI scheduling the contention resolution MAC CE may be scrambled with a C-RNTI received by the UE in the RRC Release message.

The DCI for DCI format 0_0 or DCI format 1_0 may additionally indicate CG activation or CG resume for an SDT CG configuration index. In this case, the UE may determine that a CG is activated or resumed after a RACH. When the DCI does not additionally indicate the CG activation or CG resume, the UE successfully ends the RACH procedure if contention resolution is successful. Then, the UE may deactivate an SDT BWP and stop SDT UL transmission. Thereafter, the UE may activate the initial BWP by switching to the initial BWP.

The DCI for DCI format 0_0 or DCI format 1_0 may additionally indicate an SDT BWP ID. For example, one of the SDT BWP IDs in the SDT configuration information may be indicated. Upon receiving the DCI, the UE may activate the SDT BWP to perform SDT CG UL transmission.

DCI format 0_1 may be used instead of DCI format 0_0, or DCI format 1_1 may be used instead of DCI format 1_0. Alternatively, a new DCI format for SDT may be used.

(7). When the UE receives CG activation or CG resume for a specific CG configuration index in DCI and when the UE receives MSG4 or MSGB, the UE may perform RACH contention resolution. In this case, the UE may execute CG activation or CG resume for the indicated CG configuration index. Thereafter, the UE may transmit SDT UL data depending on CG PUSCH resources which occur periodically. The UE may transmit at least one SDT TB based on a HARQ process with a HARQ process ID mapped to a CG resource. In this case, the at least one SDT TB may include SDT logical channel data mapped to the CG resource and zero or at least one MAC CE.

(8). For CG-SDT (e.g., SDT CG), a plurality of CG configurations may be provided to the UE in an RRC Release message or system information. For each CG configuration, CG PUSCH resources may be associated with a set of SSB(s) by the BS. For CG-SDT related SSBs, CG resources may not be provided to the UE. For the CG configuration, multiple CG PUSCH occasions within one or more CG periodicities may be mapped to different SSBs belonging to one subset or mapped to the same SSB(s) belonging to one subset. For the CG configuration, multiple CG PUSCHs in one or more CG periodicities may be mapped to different SSBs of one subset or mapped to the same SSB of one subset. When multiple CG PUSCHs belonging to one or more CG periodicities are mapped to different SSBs belonging to one subset of the CG configuration, the UE selects at least one SSB that is above a threshold configured by the BS. The UE may perform repetition of the same TB only on CG PUSCH occasions associated with the selected at least one SSB. When multiple CG PUSCHs belonging to one or more CG periodicities are mapped to the same SSB belonging to one subset of the CG configuration. The UE performs repetition of the same TB on different CG PUSCH occasions associated with the same SSB. Alternatively, the UE may select one or more CG PUSCH occasions to transmit the TB (in this case, the TB may or may not be repeated).

The following configurations may be provided as particular implementation examples. For example, different CG configurations may be associated with different subsets of SSBs as follows.

CG #A: SSB #1, SSB #2, SSB #3, SSB #4
CG #B: SSB #5, SSB #6, SSB #7, SSB #8

Example 1) any CG Resource of CG #a May be Used for SSB #1 to SSB #4

The BS may use the same reception beam. For example, the BS may not distinguish between SSB #1, SSB #2, SSB #3 and SSB #4 for CG #A.

The UE may select any SSB for any CG PUSCH occasion.

The UE may monitor DCI for the selected SSB based on a CG-RNTI (e.g., the UE may receive the DCI on a PDCCH, which is CRC scrambled by the CG-RNTI)

Example 2) Mapping Between Different CG PUSCH Occasions of CG #a and Different SSBs of Only One SSB Subset (i.e., SSB #1 to SSB #4)

The UE may select one CG PUSCH occasion based on a selected SSB. For example, the best SSB may be selected.

Different CG PUSCH occasions may be time division multiplexed (TDMed) and/or frequency division multiplexed (FDMed) in the same CG periodicity or over multiple CG periodicities.

For example:

For CG #A, CG PO #1 may be mapped to SSB #1 and SSB #2 for every CG periodicity of 100 ms.

For CG #A, CG PO #2 may be mapped to SSB #3 and SSB #4 for every CG periodicity of 100 ms.

The UE may monitor CG-RNTI DCI related to SSB #i in a duration after a CG PUSCH related to SSB #i.

Example 3) CG PUSCH Repetition with Different Beams

The UE may perform CG PUSCH repetition with different beams.

i) Example 3-1: Beam Sweeping Based on Mapping Between CG PUSCH Occasions and SSBs The mapping between CG PUSCH occasions and SSBs may be configured by the BS. For example, assuming that repetition=2, For CG #A, the UE may transmit a PUSCH on CG PO #1 related to SSB #1 and transmit a PUSCH on CG PO #2 related to SSB #3 within 100 ms.

3-1A: The UE may monitor CG-RNTI DCI related to SSB #i in a duration after every CG PUSCH related to SSB #i (where i=1 and 3).

3-1B: The UE may monitor CG-RNTI DCI related to SSB #1 and CG-RNTI DCI related to SSB #3 in a duration after the last CG PUSCH repetition related to SSB #3

The BS may repeat CG-RNTI DCI related to one SSB (i.e., one of SSB #1 and SSB #3).t ii) Example 3-2: Beam Sweeping Based on Configured Order The beam sweeping order may be configured by the BS. For example, assuming that repetition=4, For CG #A, the UE may transmit CG PUSCHs in the following order: SSB #1, SSB #2, SSB #3 and SSB #4.

3-1A: The UE may monitor CG-RNTI DCI related to SSB #i in a duration after every CG PUSCH related to SSB #i (where i=1, 2, 3, and 4).

3-1B: After the last CG PUSCH repetition related to SSB #4, the UE may monitor related CG-RNTI DCI in the following order: SSB #1, SSB #2, SSB #3 and SSB #4. The BS may repeat CG-RNTI DCI related to one SSB (i.e., one of SSB #1, SSB #2, SSB #3 and SSB #4).

When at least one SSB is related to a CG PUSCH resource for CG-SDT and the measured quality of the at least one SSB is more than or equal to a threshold configured by the BS, the UE may use the CG PUSCH resource for CG-SDT. If the at least one SSB of which the quality is above the threshold is related to the CG PUSCH resource for CG-SDT, the UE may use the CG PUSCH resource for CG-SDT even though the best SSB of a cell is not related to any other CG PUSCH occasions. However, if the measured quality of an SSB configured for the CG-SDT does not exceed the threshold for the CG-SDT, the UE may trigger the RACH (e.g., RA-SDT) to allow the BS to reconfigure the CG-SDT. During the RACH procedure, the UE may report SSB(s) having good measurement results to the BS. For example, the reported SSB(s) may be the best SSB of a serving cell or SSBs of which quality is above the threshold configured by the BS.

For each CG periodicity of a CG configuration, multiple PUSCH occasions may be configured by frequency division multiplexing/time division multiplexing/space division multiplexing (FDM/TDM/SDM). The UE may perform PUSCH repetition based on the same or different SSBs related to multiple PUSCH occasions. The UE may change transmission beams for a plurality of CG PUSCH occasions for initial HARQ transmission of a specific TB (e.g., initial transmission of a corresponding HARQ process) or for retransmission of the TB and then repeatedly transmit the corresponding TB. For example, the UE may repeatedly transmit a CG PUSCH with a plurality of transmission beams in one CG periodicity. In this case, a TB for the same HARQ process ID may be repeatedly transmitted within the CG periodicity. Alternatively, the UE may repeatedly transmit a CG PUSCH with a plurality of transmission beams over a plurality of CG periodicities. In this case, the HARQ process ID of a TB transmitted on the PUSCH may be indicated by CG-UCI on each CG PUSCH, the plurality of CG periodicities may be mapped to the same HARQ process ID, or different HARQ process IDs may be mapped to different CG periodicities.

If the HARQ process ID of a TB transmitted on a PUSCH is capable of being indicated by CG-UCI, the UE may inform the BS that different CG PUSCHs are transmitted in different TBs by indicating different HARQ process IDs in the CG-UCI, regardless of CG periodicities.

When a plurality of CG periodicities are mapped to the same HARQ process ID, the BS may periodically allocate different HARQ process IDs based on N CG periodicities designated by the BS. All different CG PUSCHs in the N CG periodicities may carry a TB for the same HARQ process.

For repeated transmission, the UE may change beams limitedly only for SSBs mapped to a corresponding CG configuration. The BS may configure a pattern of SSBs switching during the repeated transmission. For example, the BS may configure that the transmission is repeated on four CG PUSCH resources while SSB #k and SSB #k+1 are repeated in ascending order.

For the repeated transmission, the UE may monitor a PDCCH for retransmission for each CG PUSCH transmission. Alternatively, the UE may monitor the PDCCH for retransmission after the end of the repeated transmission. Further, the UE may monitor the PDCCH after transmitting SSBs configured for SDT or SSBs configured for the corresponding CG configuration for one cycle. For example, when SSB #k and SSB #k+1 are repeated in ascending order and transmitted repeatedly on four 4 CG PUSCH resources, the UE may monitor the PDCCH by starting a discontinuous reception (DRX) round trip time (RTT) timer for each CG PUSCH transmission. Alternatively, after transmitting SSB #k and SSB #k+1 once, the UE may monitor the PDCCH by starting the DRX RTT timer. Further, after repeatedly transmitting all four CG PUSCH resources, the UE may monitor the PDCCH by starting the DRX RTT timer. When the DRX RTT timer starts, the UE may not monitor the PDCCH for retransmission while the DRX RTT timer is running. While a retransmission DRX timer, which starts after the DRX RTT timer expires, is running, the UE may monitor the PDCCH for retransmission.

Therefore, the time at which the UE monitors the PDCCH for retransmission may be after the UE repeatedly transmits the CG PUSCH on up to all N beams designated for CG-SDT. Alternatively, the time at which the UE monitors the PDCCH for retransmission may be after the UE repeatedly transmits the CG PUSCH M times, where the CG PUSCH carries the TB of the same HARQ process. The time at which the UE monitors the PDCCH for retransmission may be designated after the UE transmits the CG PUSCH transmission for each beam.

(9). To receive the retransmission resource of a CG or deactivate/release/suspend the CG, the UE may monitor an SDT SS. The UE may receive a CG retransmission resource for a specific HARQ process ID in the SDT SS. Alternatively, the UE may receive DCI indicating deactivation/release/suspension of the CG in the SDT SS.

For initial transmission of a specific TB received on a CG PUSCH occasion, if the BS knows the transmission SSB beam of a CG PUSCH (or candidates of the transmission SSB beam), the UE may monitor a PDCCH for the retransmission resource in a CORESET related to the transmission SSB beam.

The BS may know the transmission SSB beam of the CG PUSCH (or the candidates of the transmission SSB beam) as follows.

Mapping between SSBs and CG PUSCH occasions for one or more CG periodicities: When this mapping is configured, the BS may know the transmission SSB beam or the candidates of the transmission SSB beam from the CG PUSCH occasion used by the UE.

Mapping between SSBs and CG configurations:

When this mapping is configured, the BS may know the transmission SSB beam or the candidates of the transmission SSB beam from the CG configuration of the CG PUSCH occasion used by the UE.

If CG-SDT starts immediately after the RACH, the UE and BS may assume an SSB determined by the RACH. Alternatively, the UE and BS may assume an SSB determined based on the most recent RACH. The UE may monitor the PDCCH in a CORESET related to the determined SSB. The BS may scramble the CRC of DCI allocating retransmission resources with a C-RNTI or CS-RNTI.

For initial HARQ transmission for the specific TB received on the CG PUSCH occasion (e.g., initial transmission of the corresponding HARQ process), if the BS does not know the transmission SSB beam of the CG PUSCH (or the candidates of the transmission SSB beam), the BS may repeatedly transmit DCI in a plurality of CORESETs mapped to a plurality of different SSBs. In this case, the CRC of the DCI may be scrambled by a C-RNTI or CS-RNTI, which may include retransmission resources. The UE may perform the initial HARQ transmission for the specific TB (e.g., initial transmission of the corresponding HARQ process) on the CG PUSCH occasion. By assuming that the BS receives the initial HARQ transmission (e.g., initial transmission of the corresponding HARQ process) on the CG PUSCH occasion, the UE may monitor a PDCCH for the DCI. In this case, the UE may select an SSB mapped to the CG PUSCH occasion of the initial HARQ transmission (e.g., initial transmission of the corresponding HARQ process) and monitor the PDCCH in at least one CORESET associated with the selected SSB (see FIG. 10). To this end, the BS may map the same or different SSBs to different CORESETs in the SDT related SS as follows. The mapped SSBs may be limited only to SDT related SSBs configured for the corresponding UE.

1) Option 1: One CORESET configuration may be associated with multiple SSBs configured for CG-SDT. The UE may monitor DCI in any CORESET in an SDT SS associated with the selected SSB(s).

2) Option 2: Multiple CORESET configurations may be associated with multiple SSBs configured for CG-SDT. The BS may repeat the same DCI in multiple CORESETs associated with multiple SSBs for allocation of retransmission resources.

i. Option 2-1: Different CORESET configurations for different CORESET locations may have different CORESET IDs associated with different SSBs. The UE may monitor DCI in a CORESET associated with the selected SSB.

ii. Option 2-2: Different CORESET configurations for the same CORESET location may have different CORESET IDs associated with different SSBs. The UE may monitor DCI in overlapping CORESETs associated with the selected SSB.

iii. Option 2-3: Different CORESET configurations for the same CORESET location may have the same CORESET ID associated with different SSBs. The UE may monitor DCI in overlapping CORESETs associated with the selected SSB.

(10). The UE may perform retransmission when retransmission resources are allocated by DCI received based on PDCCH monitoring.

Figure 10:
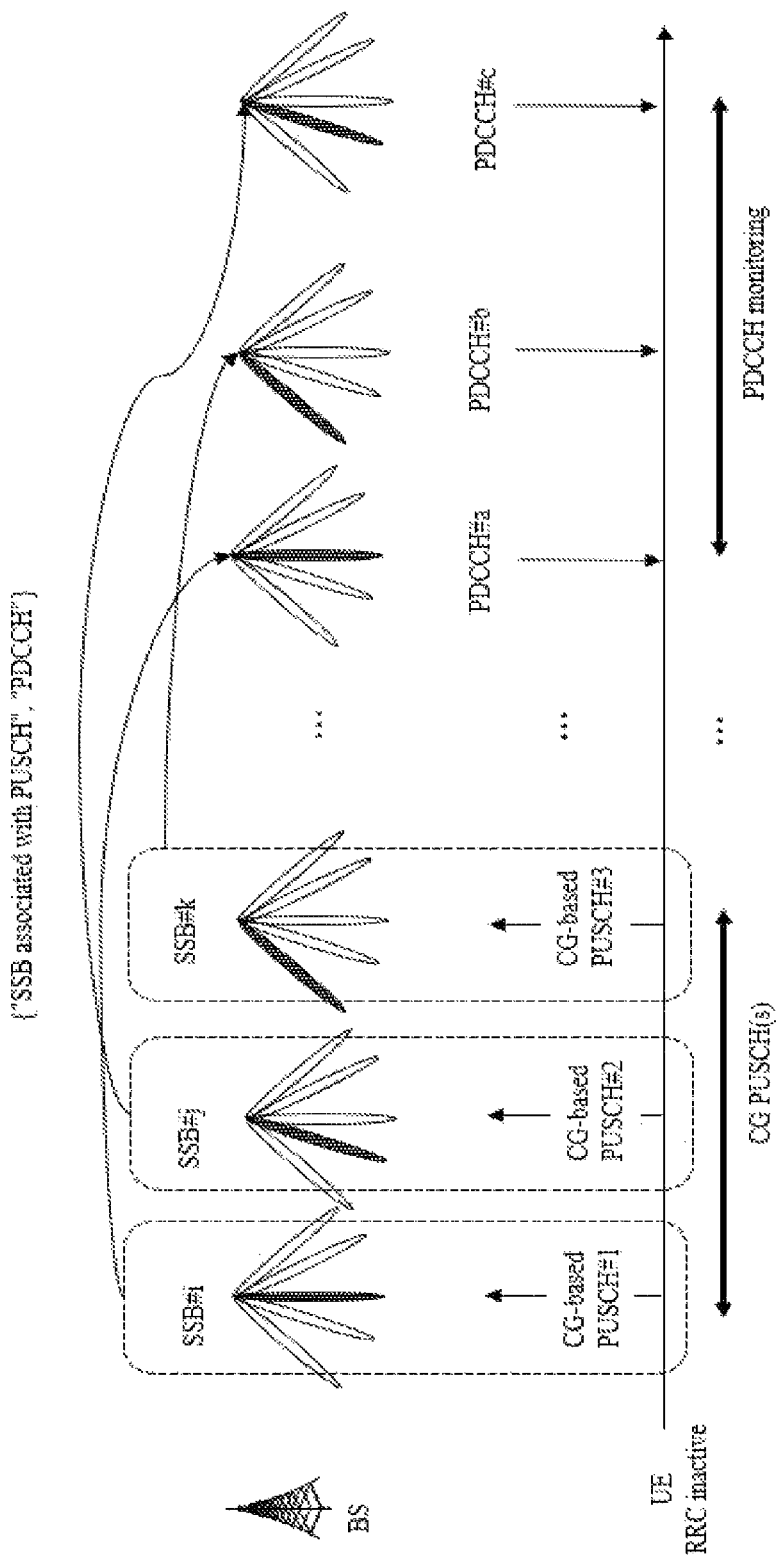
FIG. 10 is a diagram for explaining association between a CG PUSCH resource, a synchronization signal block (SSB), a physical downlink control channel (PDCCH) according to an embodiment of the present disclosure.

FIG. 10 is a diagram for explaining association between a CG PUSCH resource, an SSB, a PDCCH according to an embodiment of the present disclosure. FIG. 10 is a particular implementation of the above-described examples, and thus the scope of the present disclosure is not limited to FIG. 10. The details described above may be referred to in FIG. 10.

Since no beam procedures are defined/performed in the RRC_INACTIVE mode, it is difficult to know which DL beam is selected/monitored by the UE in the RRC_INACTIVE mode for PDCCH reception. To address this issue, a method by which the BS maps/reserves a plurality of DL resources/beams in advance for the UE in the RRC_INACTIVE mode may be considered. However, in this case, there is a problem in resource efficiency because unnecessary DL resources/beams are excessively consumed and the resources are not appropriate to be used for SDT in the RRC_INACTIVE mode. In addition, it is difficult to configure the beam/TCI/QCL assumption to be used for SDT transmission after or before transmission of an RRC Release message (e.g., time-varying properties of the optimal beam/TCI/QCL assumption).

To solve such a problem, the UE may be configured with a mapping/association relationship between PUSCHs and SSBs as shown in FIG. 10 according to an embodiment of the present disclosure. The UE in the RRC_INACTIVE state may monitor a PDCCH (e.g., HARQ feedback for a CG PUSCH) based on an SSB associated with CG PUSCH transmission. Specifically, the UE may assume that the SSB associated with the corresponding PUSCH is quasi-co-located (QCLed) with a DMRS antenna port of the corresponding PDCCH for large-scale channel characteristics such as average gain.

Figure 11:
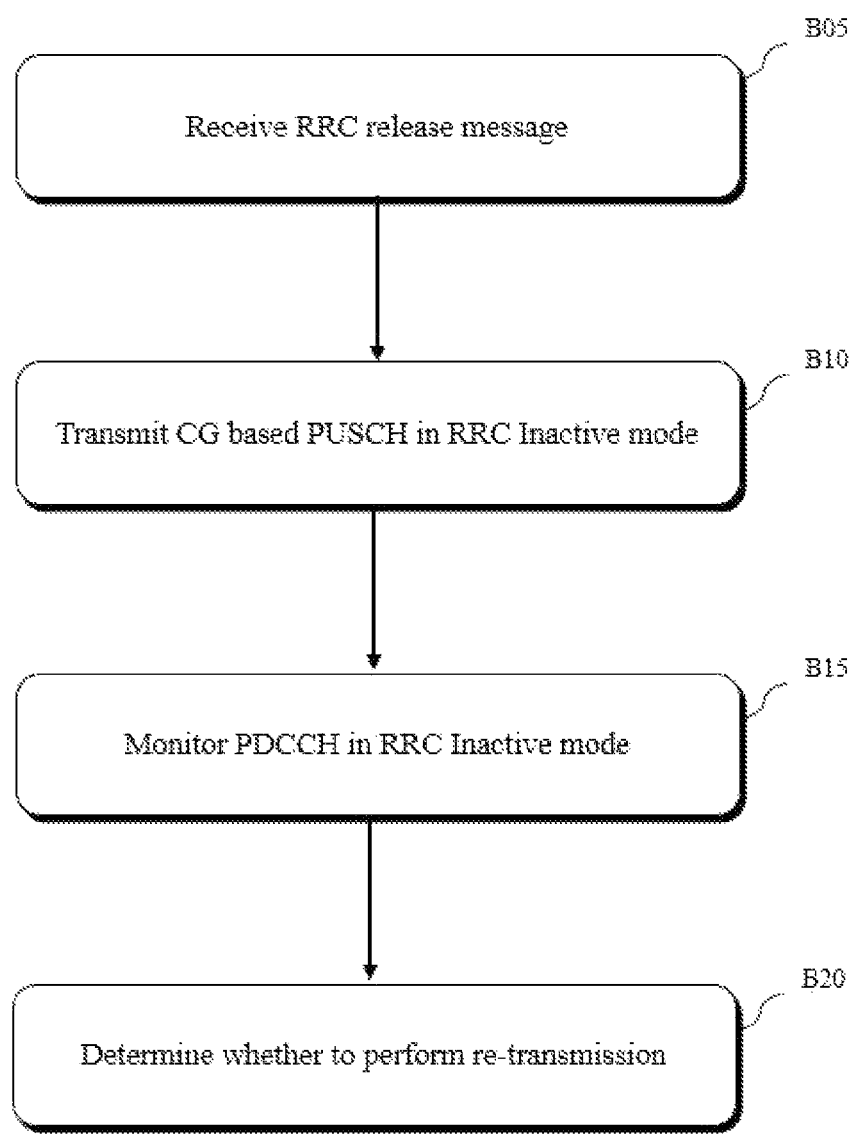
FIGS. 11 and 12 are diagrams for explaining operations of a user equipment (UE) and a base station (BS) according to an embodiment of the present disclosure.
Figure 12:
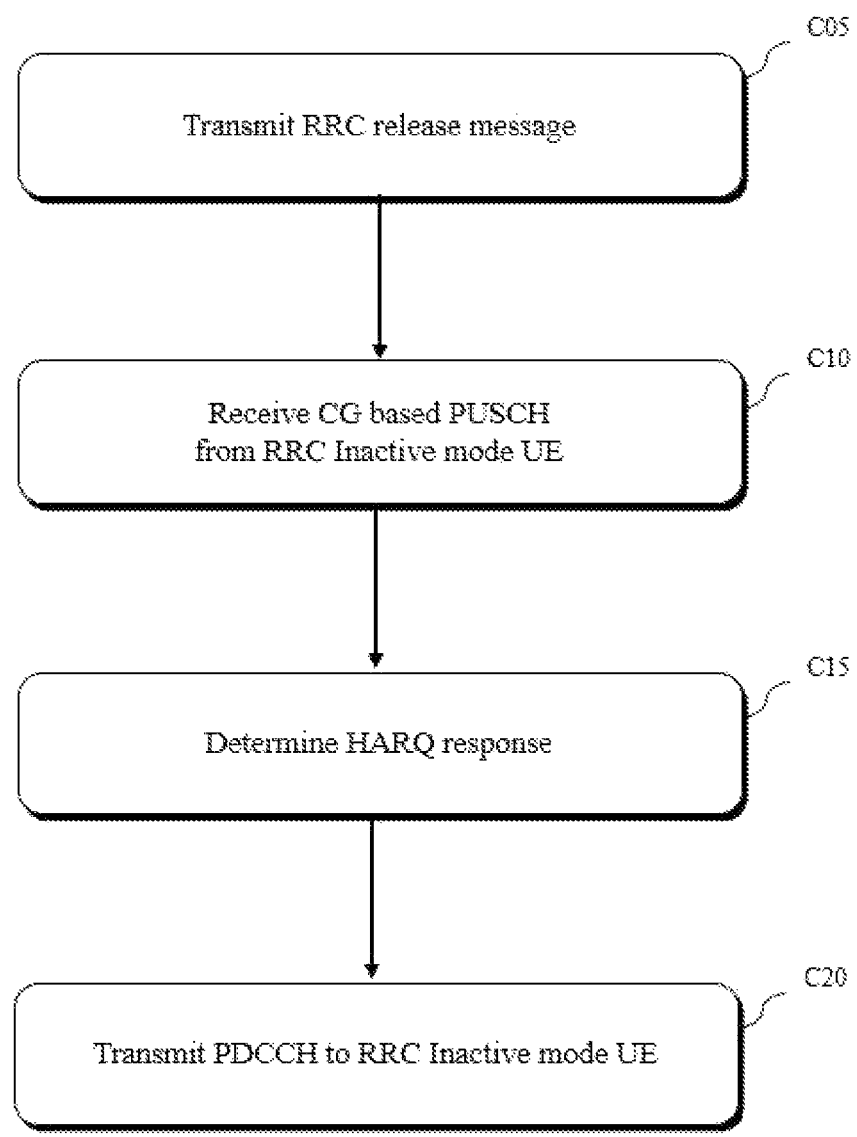

FIGS. 11 and 12 are diagrams for explaining operations of a UE and a BS according to an embodiment of the present disclosure. FIGS. 11 and 12 are particular implementations of the above-described examples, and thus the scope of the present disclosure is not limited to FIGS. 11 and 12. The details described above may be referred to in FIGS. 11 and 12.

Referring to FIGS. 11 and 12, the UE may receive an RRC Release message including CG configuration information in the RRC_CONNECTED state (B05). The UE may switch from the RRC_CONNECTED state to the RRC_INACTIVE state based on the RRC Release message.

The BS may transmit the RRC Release message including the CG configuration information when the UE is in the RRC_CONNECTED state (C05). The UE may transmit a CG-based PUSCH based on the CG configuration information included in the RRC Release message (B10). The BS may receive the CG-based PUSCH based on the CG configuration information included in the RRC Release message when the UE is in the RRC_INACTIVE state (C10).

The BS may determine a HARQ response regarding whether to trigger retransmission of the CG-based PUSCH (C15).

The BS may transmit a PDCCH carrying DCI including the HARQ response (C20). Based on i) that the CG-based PUSCH is received while the UE is in the RRC_INACTIVE state, and ii) that the CG-based PUSCH is associated with a specific SSB among SSBs broadcast in a wireless communication system, the BS may transmit the PDCCH to the UE maintaining the RRC_INACTIVE state based on the specific SSB.

The UE may monitor the PDCCH carrying the DCI including the HARQ response to the CG-based PUSCH transmission (B15). Based on that i) that the CG-based PUSCH is transmitted in the RRC_INACTIVE state, and ii) that the CG-based PUSCH is associated with the specific SSB among the SSBs broadcast in the wireless communication system, the UE may monitor the PDCCH based on the specific SSB while maintaining the RRC Inactive state.

The UE may determine whether to perform retransmission of the CG-based PUSCH based on the result of the PDCCH monitoring (B20).

The UE may monitor the PDCCH based on the channel property for the specific SSB.

The UE may monitor the PDCCH by assuming that the channel property for the specific SSB is the same as the channel property for the PDCCH.

The RRC Release message may include information on DL frequency resources related to the CG-based PUSCH and information on UL frequency resources related to the CG-based PUSCH.

The DL frequency resource information and the UL frequency resource information may include information on a DL BWP to be used in the RRC_INACTIVE state and information on a UL BWP to be used in the RRC_INACTIVE state, respectively.

Monitoring the PDCCH based on the specific SSB in response to the CG-based PUSCH may be performed only when the UE maintains the RRC_INACTIVE state.

The CG-based PUSCH transmission may be related to CG-SDT supported in the RRC_INACTIVE state.

The PDCCH monitoring may be performed in an SS configured for the CG-SDT.

The CG configuration information may be related to UE-dedicated RRC signaling.

The specific SSB may be related to initial transmission of a HARQ process to which the CG-based PUSCH belongs.

The various details, functions, procedures, proposals, methods, and/or operational flowcharts described in this document may be applied to a variety of fields that require wireless communication/connections (e.g., 5G) between devices.

Hereinafter, a description will be given in detail with reference to the drawings. In the following drawings/descriptions, the same reference numerals may denote the same or corresponding hardware blocks, software blocks, or functional blocks unless specified otherwise.

Figure 13:
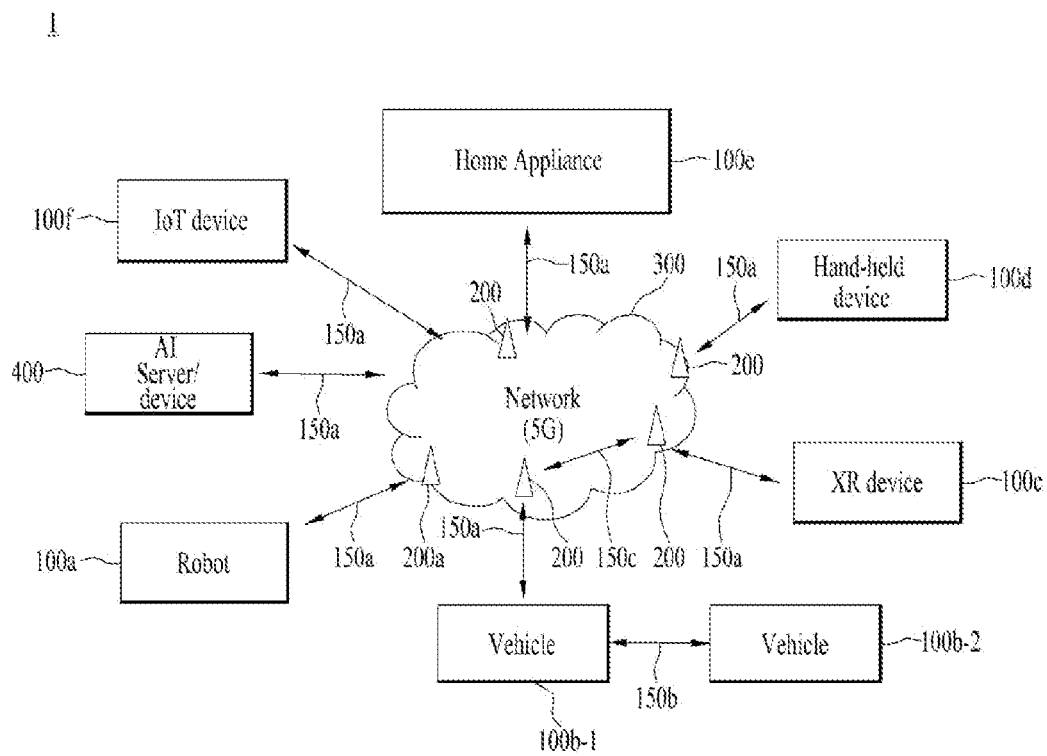
FIGS. 13 to 16 illustrate a communication system 1 and wireless devices applicable to the present disclosure.

FIG. 13 illustrates a communication system 1 applied to the present disclosure.

Referring to FIG. 13, a communication system 1 applied to the present disclosure includes wireless devices, base stations (BSs), and a network. Herein, the wireless devices represent devices performing communication using radio access technology (RAT) (e.g., 5G New RAT (NR)) or Long Term Evolution (LTE)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or D2D communication), or inter-BS communication (e.g., relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
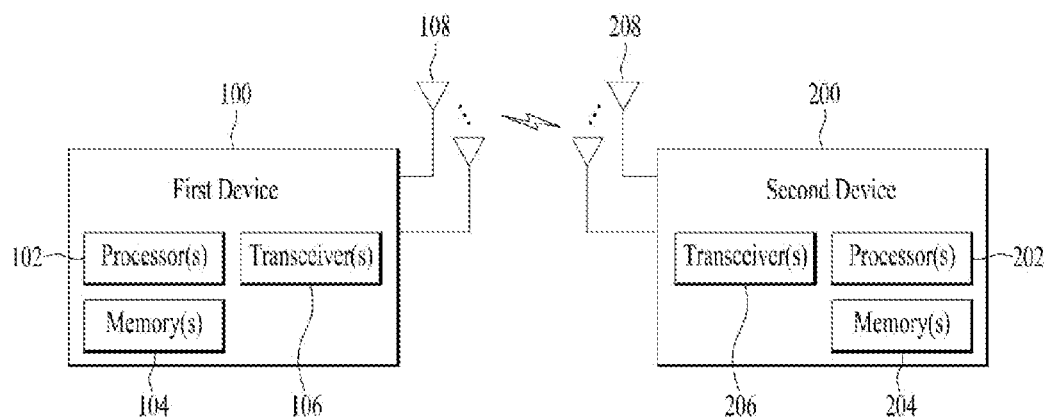

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
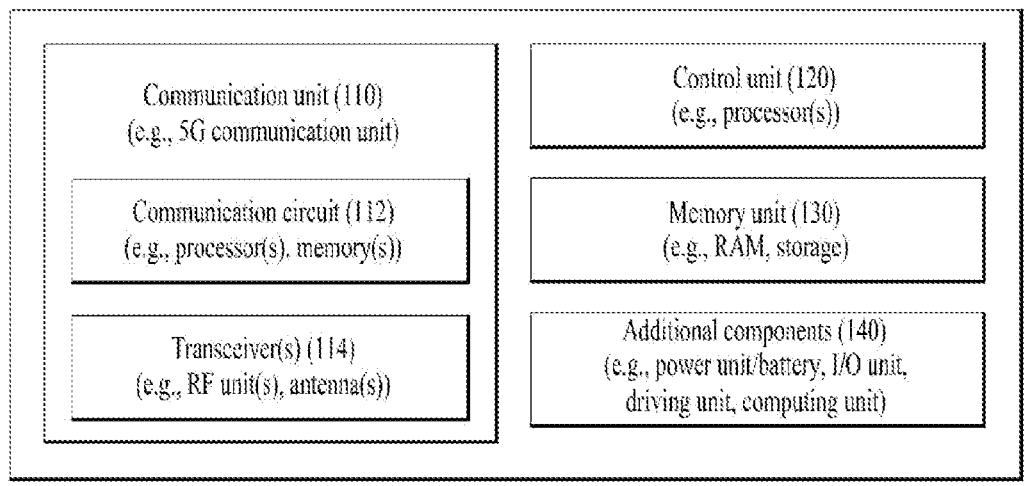

FIG. 15 illustrates another example of a wireless device applied to the present disclosure. The wireless device may be implemented in various forms according to a use-case/service (refer to FIG. 13).

Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a Fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 16:
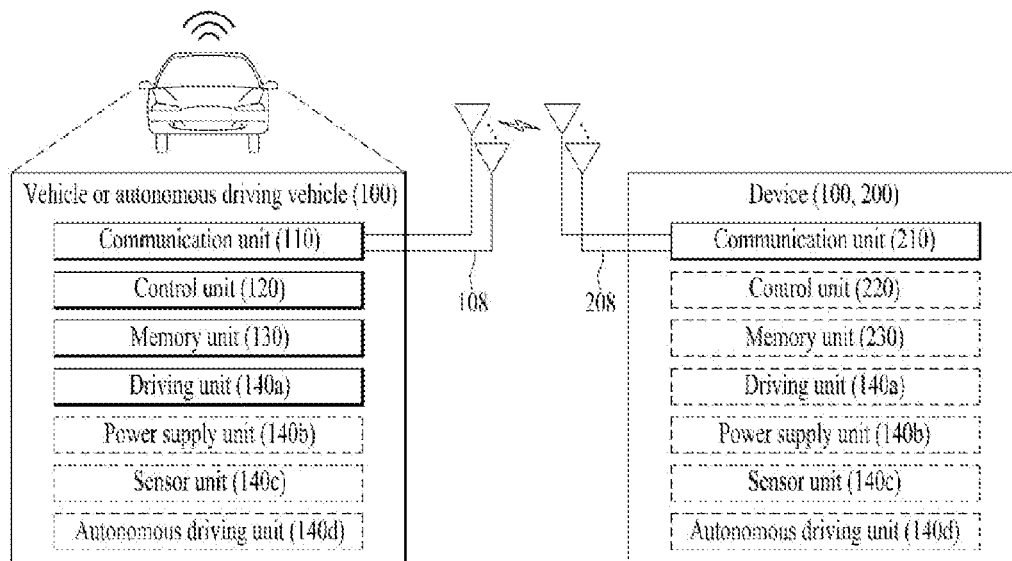

FIG. 16 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 16, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an electronic control unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 17:
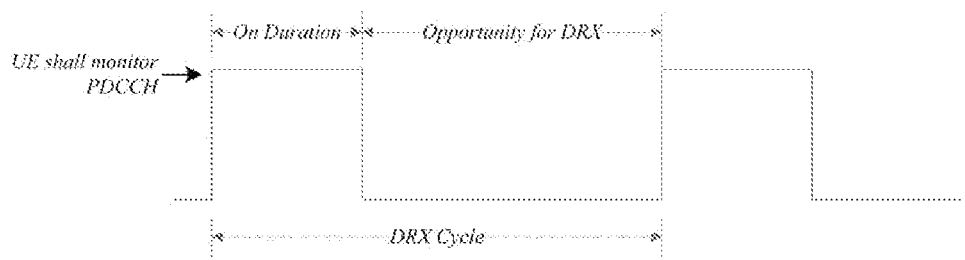
FIG. 17 illustrates discontinuous reception (DRX) operation applicable to the present disclosure.

FIG. 17 is a diagram illustrating a discontinuous reception (DRX) operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 17, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 10 describes a DRX operation of a UE (in the RRC_CONNECTED state). Referring to Table 10, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 10

| | Type of signals | UE procedure |
| --- | --- | --- |
| 1$^{st}$ step | RRC signalling (MAC-CellGroupConfig) | Receive DRX configuration information |

TABLE 10-continued

| | Type of signals | UE procedure |
| --- | --- | --- |
| 2$^{nd}$ Step | MACCE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected.

Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method of transmitting a signal by a user equipment (UE) in a radio resource control (RRC) Inactive state in a wireless communication system, the method comprising:
    receiving an RRC Release message including configured grant (CG) configuration information in an RRC Connected state;
    switching from the RRC Connected state to an RRC Inactive state based on the RRC Release message;
    transmitting a CG-based physical uplink shared channel (PUSCH) based on the CG configuration information included in the RRC Release message;
    monitoring a physical downlink control channel (PDCCH) carrying downlink control information (DCI) including a hybrid automatic repeat request (HARQ) response to the CG-based PUSCH transmission; and
    determining whether to perform retransmission of the CG-based PUSCH based on a result of the PDCCH monitoring,
    wherein the CG-based PUSCH is transmitted in the RRC Inactive state, and the CG-based PUSCH is associated with a specific synchronization signal block (SSB) among SSBs broadcast in the wireless communication system, and
    wherein the RRC Release message includes a UE-specific identifier related to small data transmission (SDT), and the UE monitors the PDCCH based on the UE-specific identifier related to the SDT in the RRC Inactive state, and
    wherein an SDT-dedicated timer which is related to a random access procedure, is started based on the RRC Release message for switching from the RRC Connected state to the RRC Inactive state.

2. The method of claim 1, wherein the UE monitors the PDCCH based on a channel property for the specific SSB.

3. The method of claim 2, wherein the UE monitors the PDCCH by assuming that the channel property for the specific SSB is equal to a channel property for the PDCCH.

4. The method of claim 1, wherein the RRC Release message includes downlink (DL) frequency resource information related to the CG-based PUSCH and uplink (UL) frequency resource information related to the CG-based PUSCH.

5. The method of claim 4, wherein the DL frequency resource information and the UL frequency resource information include information on a DL bandwidth part (BWP) to be used in the RRC Inactive state and information on a UL BWP to be used in the RRC Inactive state, respectively.

6. The method of claim 1, wherein the CG-based PUSCH transmission is related to CG-SDT supported in the RRC Inactive state.

7. The method of claim 6, wherein the PDCCH monitoring is performed in a search space configured for the CG-SDT.

8. The method of claim 1, wherein the CG configuration information is related to UE-dedicated RRC signaling.

9. The method of claim 1, wherein the specific SSB is related to initial transmission of a HARQ process to which the CG-based PUSCH belongs.

10. A non-transitory computer-readable storage medium having stored thereon a program for executing the method of claim 1.

11. A device for wireless communication, the device comprising:
    a memory configured to store instructions; and
    a processor configured to perform operations by executing the instructions,
    wherein the operations performed by the processor comprise:
    receiving a radio resource control (RRC) Release message including configured grant (CG) configuration information in an RRC Connected state;
    switching from the RRC Connected state to an RRC Inactive state based on the RRC Release message;
    transmitting a CG-based physical uplink shared channel (PUSCH) based on the CG configuration information included in the RRC Release message;
    monitoring a physical downlink control channel (PDCCH) carrying downlink control information (DCI) including a hybrid automatic repeat request (HARQ) response to the CG-based PUSCH transmission; and
    determining whether to perform retransmission of the CG-based PUSCH based on a result of the PDCCH monitoring,
    wherein the CG-based PUSCH is transmitted in the RRC Inactive state, and the CG-based PUSCH is associated with a specific synchronization signal block (SSB) among SSBs broadcast in the wireless communication system,
    wherein the RRC Release message includes a device-specific identifier related to small data transmission (SDT), and the processor monitors the PDCCH based on the device-specific identifier related to the SDT in the RRC Inactive state, and
    wherein an SDT-dedicated timer which is related to a random access procedure, is started based on the RRC Release message for switching from the RRC Connected state to the RRC Inactive state.

12. The device of claim 11, wherein the device is an application-specific integrated circuit (ASIC) or a digital signal processor.

13. The device of claim 11, wherein the device is a user equipment (UE) operating in a 3rd generation partnership project (3GPP) based wireless communication system.

14. A method of receiving a signal by a base station (BS) in a wireless communication system, the method comprising:
    transmitting a radio resource control (RRC) Release message including configured grant (CG) configuration information while a user equipment (UE) is in an RRC Connected state;
    receiving a CG-based physical uplink shared channel (PUSCH) based on the CG configuration information included in the RRC Release message while the UE is in an RRC Inactive state;
    determining a hybrid automatic repeat request (HARQ) response regarding whether to trigger retransmission of the CG-based PUSCH; and
    transmitting a physical downlink control channel (PDCCH) carrying downlink control information (DCI) including the HARQ response,
    wherein the CG-based PUSCH is received while the UE is in the RRC Inactive state, and the CG-based PUSCH is associated with a specific synchronization signal block (SSB) among SSBs broadcast in the wireless communication system,
    wherein the RRC Release message includes a UE-specific identifier related to small data transmission (SDT), and the BS transmits the PDCCH based on the UE-specific identifier related to the SDT to the UE in the RRC Inactive state, and wherein an SDT-dedicated timer which is related to a random access procedure, is started based on the RRC Release message for switching from the RRC Connected state to the RRC Inactive state.

15. A base station (BS) for wireless communication, the BS comprising:

a transceiver; and a processor configured to:

control the transceiver to transmit a radio resource control (RRC) Release message including configured grant (CG) configuration information while a user equipment (UE) is in an RRC Connected state;

receive a CG-based physical uplink shared channel (PUSCH) based on the CG configuration information included in the RRC Release message while the UE is in an RRC Inactive state;

determine a hybrid automatic repeat request (HARQ) response regarding whether to trigger retransmission of the CG-based PUSCH; and transmit a physical downlink control channel (PDCCH) carrying downlink control information (DCI) including the HARQ response, wherein the CG-based PUSCH is received while the UE is in the RRC Inactive state, and the CG-based PUSCH is associated with a specific synchronization signal block (SSB) among SSBs broadcast in the wireless communication system, wherein the RRC Release message includes a UE-specific identifier related to small data transmission (SDT), and the processor transmits the PDCCH based on the UE-specific identifier related to the SDT to the UE in the RRC Inactive state, and wherein an SDT-dedicated timer which is related to a random access procedure, is started based on the RRC Release message for switching from the RRC Connected state to the RRC Inactive state.

\* \* \* \* \*